United States Patent [19]
Goto et al.

[11] Patent Number: 5,107,482
[45] Date of Patent: Apr. 21, 1992

[54] OPTICAL INFORMATION RECORDING METHOD AND APPARATUS AND RECORDING MEDIUM USED THEREFOR

[75] Inventors: Norio Goto, Tokyo; Masaji Ishigaki, Yokohama; Yukio Fukui, Tokyo, all of Japan

[73] Assignee: Hitachi, Ltd., Tokyo, Japan

[21] Appl. No.: 362,699

[22] Filed: Jun. 7, 1989

[30] Foreign Application Priority Data

Jun. 8, 1988 [JP] Japan .................. 63-139305

[51] Int. Cl.$^5$ .................................. G11B 7/00
[52] U.S. Cl. .................. 369/100; 369/275.2; 369/116
[58] Field of Search ............... 369/100, 116, 154, 13, 369/275.1, 121, 110, 275.2; 365/113; 430/945, 19; 360/114

[56] References Cited

U.S. PATENT DOCUMENTS

| | | | |
|---|---|---|---|
| 4,710,911 | 12/1987 | Yamada et al. | 369/100 X |
| 4,787,077 | 11/1988 | Barton | 369/100 X |
| 4,841,514 | 6/1989 | Tsuboi et al. | 361/100 X |
| 4,858,220 | 8/1989 | Funada | |
| 4,876,667 | 10/1989 | Ross | 365/113 X |
| 4,910,724 | 3/1990 | Sakagami et al. | 369/100 X |
| 4,924,436 | 5/1990 | Strand | 365/113 X |
| 4,944,037 | 6/1990 | Ando | 369/113 X |

FOREIGN PATENT DOCUMENTS

| | | |
|---|---|---|
| 265971 | 4/1988 | European Pat. Off. |
| 59-60742 | 9/1982 | Japan ............ 369/100 |
| 61-8739 | 1/1986 | Japan |
| 63-103447 | 5/1988 | Japan |

OTHER PUBLICATIONS

"High Speed Overwritable Phase Change Optical Disk Material," Japanese Journal of Applied Physics, Supplements, vol. 26, 1987, pp. 61-66.

"Observation of Fast Microscopic Phase Change Phenomena of Chalcogenide Thin Films," Japanese Journal of Applied Physics, Supplements, vol. 26, 1987, pp. 55-60.

Jamberdino, "Optical Storage Media" Jun. 1983 from SPIE *The International Society for Optical Engineering.*

*Primary Examiner*—Roy N. Envall, Jr.
*Assistant Examiner*—Thang V. Tran
*Attorney, Agent, or Firm*—Antonelli, Terry, Stout & Kraus

[57] ABSTRACT

A method and apparatus for optically recording information in which the phase state of each recording position of the recording film of a recording medium such as an optical disk is reversibly changed between an amorphous phase and a crystalline phase using a single laser beam, thereby optically recording information on the the recording film. The recording position on the recording film is heated to the melting point thereof or more through laser beam irradiation irrespective of the information to be recorded. After completion of the heating, in order to change the phase state of the recording film at the recording position in accordance with the information, the power and/or irradiation time of the laser beam is controlled so as to provide different times required for the temperature of the recording position to pass through the crystallization temperature region of the recording film. The recording medium has at least one record of data indicative of the melting point of the recording film and data indicative of the time required to pass through the crystallization temperature region for placing the recording position in the amorphous state or crystalline state.

6 Claims, 22 Drawing Sheets

| | OPERATING CONDITIONS | CARRIER/ NOISE RATIO | ERASING RATIO |
|---|---|---|---|
| EXAMPLE ① | $P_1 = 12.5\text{mW} > P_M$ ($tp1 = 0.2\mu S$) $P_2 = 9.5\text{mW} > P_M$ ($tp2 = 0.2\mu S$) | 49 dB | 41 dB |
| EXAMPLE ② | $P_1 = 16\text{mW} > P_M$ ($tp1 = 50 nS$) $P_2 = 9.5\text{mW} > P_M$ ($tp2 = 0.2\mu S$) | 52 dB | 40 dB |
| CONVENTIONAL EXAMPLE ① | $P_1 = 14\text{mW} > P_M$ ($tp1 = 0.2\mu S$) $P_2 = 8\text{mW} < P_M$ ($tp2 = 0.2\mu S$) | 52 dB | 27 dB |
| CONVENTIONAL EXAMPLE ② | $P_1 = 16\text{mW} > P_M$ ($tp1 = 50 nS$) $P_2 = 8\text{mW} < P_M$ ($tp2 = 0.2\mu S$) | 54 dB | 20 dB |

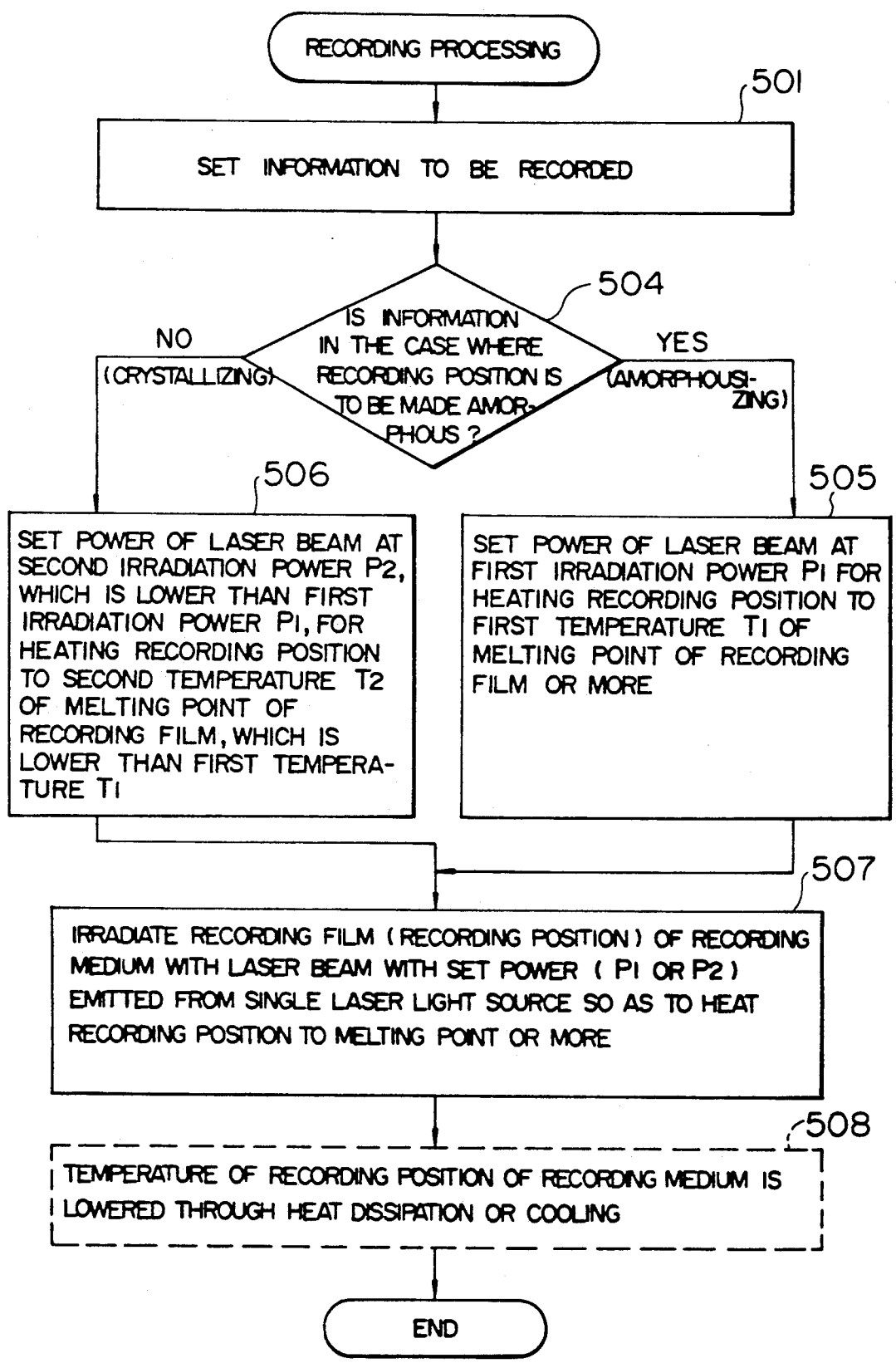

- 131 LASER BEAM
- 132 RESIN SUBSTRATE
- 133 PROTECTION FILM (1000Å)
- 134 RECORDING FILM (400Å)
- 135 PROTECTION FILM (2000Å)
- 136 2P PROTECTION FILM (5~20μm)
- 137 PROTECTION SUBSTRATE

- 141 POWER P1
- 142 POWER P2
- 143 REPRODUCING LEVEL

OPTICAL INFORMATION RECORDING METHOD AND APPARATUS AND RECORDING MEDIUM USED THEREFOR

BACKGROUND OF THE INVENTION

The present invention relates to a method and an apparatus for optically recording information and to a recording medium therefore, and more particularly to those which permit overwriting using a single beam and which can provide a high overwrite erasing capability.

As a technique of optically recording and reproducing information, it is known to use a phase-change film as a recording medium, and change laser irradiation power to cause the phase change thereof, thereby changing the optical property thereof so as to record and reproduce information. Among techniques of using the phase-change film, the technique of overwriting new data on old data while modulating the irradiation intensity of a single laser beam is disclosed in technical search reports in the Japanese literature, "DENSI JOHO TSUSIN GAKKAI, SINGAKU GIHO", Vol. 87, No. 310 CPM87-88, 88, 89, 90.

The operation of the prior art single beam overwrite technique disclosed in the references is summarized as follows. A laser beam having the power profile as shown in FIG. 22 is irradiated onto the optical disk (recording medium) having a phase-change recording film, as shown in FIG. 21. The power profile of this laser beam is such that the pulsating power $P_1$ for recording information at a recording position which is to be amorphous is superposed on the D.C. power $P_2$ for recording recording information at a recording position which is to be crystalline.

FIG. 23 shows a relation between the pulse width and power of laser radiation for the recording film and the phase change thereof. As seen from the figure, with a predetermined pulse width, by varying the irradiation power, the recording film can be changed to be crystalline or amorphous. Hereinafter, making or becoming crystalline is referred to as "crystallizing" and making or becoming amorphous is referred to as "amorphousizing".

The prior art technique discloses the basic operation of implementing the phase-change single beam overwrite but has the following problem. No consideration is given to the property of the recording film and the recording condition which are required to provide a high erasing ratio, i.e. for the providing of sufficiently high erasing ratio required to actually perform a phase-change single beam overwrite. Thus, the prior art provides a low erasing ratio, and so a large error rate due to incomplete erasure of old data. Accordingly, the prior art cannot satisfy the required reliability.

The above problem will be explained in detail below. The recording process in the phase-change recording system is roughly represented by the crystallization state of the recording film. The crystallization state can be expressed by formula of JMA (Johnson, Mehl and Avrami) as disclosed in the reference of Japan Journal of Applied Physics, Vol. 26 (1987) Supplement 26-4.

The crystallization time $\tau(T)$ at the temperature $T(K)$ of the recording film can be expressed by $$\tau(T) = \nu \times \exp(Ea/kT + Q/((Tm-T) \times (Tm-T) \times T)) \quad (1)$$

where $\nu$: crystal nucleus frequency factor Ea: activation energy
$k$: Boltzman constant
$Tm$: melting point of the recording film
$Q$: reaction constant number.

FIG. 24 shows the relation between the temperature T and the crystallization time $\tau(T)$ in Equation (1). In this figure, the temperature (abscissa) is represented by $1000/T$. In a low temperature region on the right side of the figure, according to the increase of temperature, the crystallization time $\tau(T)$ is shortened. However, in contrast in a temperature region in the neighborhood of the melting point Tm, according to the increase of temperature, the crystallization time $\tau(T)$ is lengthened since the dissociation probability of atoms is increased as the temperature approaches the melting point Tm of the recording film.

Namely, Equation (1) shows that the temperature where the crystallization time $\tau(T)$ is shortest and so the recording film is easily crystallized is located at a temperature slightly lower than the melting point Tm. This temperature where the crystallization time $\tau(T)$ is shortest is referred to as a nose temperature Tn since in the graph of FIG. 24 it looks like a nose tip.

At the nose temperature Tn, $$\delta(\tau(T))/\delta T = 0$$

Tn is the root of the following Equation (2) when the differentiation of Equation (1) is set at zero.

$$-\nu \exp\left(\frac{Ea}{kT} + \frac{Q}{T(Tm-T)^2}\right) \times f(T)/kT^2(Tm-T)^3 = 0 \quad (2)$$

$$\text{i.e. } f(T) = (Tm-T)^3 - 3\frac{Qk}{Ea}(T - Tm/3) = 0$$

The root is given, as shown in FIG. 25, by a T coordinate at the intersecting point of the third order curve having a coefficient of $-1$ passing a coordinate $(Y, T) = (0, Tm)$ $Y = (Tm-T)$ and a line having a gradient of $3 \times Q \times k/Ea$ passing a coordinate $(Y, T) = (0, Tm/3)$ $$Y = 3 \times Q \times k/Ea \times (T - Tm/3).$$

As the reaction constant number Q becomes large, the gradient of the line becomes large, so that the intersecting point is shifted towards T : small. On the other hand, as the activation energy Ea becomes large, the gradient of the line becomes small, the intersecting point is shifted T : large.

FIG. 26 shows the relation between $Q \times k/Ea$ and the nose temperature Tn obtained using the formula of Cardann.

The crystallization rate X when the temperature is held at the temperature T for a time t is represented by $$\delta X = 1 - \exp\{-(\delta t/\tau(T))^n\} \quad (3)$$

where n: reaction constant. In the phase-change recording film, $n = 2 \sim 3$.

The crystallization of a recording film when it is heated from room temperature to high temperatures through laser irradiation thereto accords with the integration of the crystallization rates at the respective temperatures in Equation (3) in accordance with the temperature profile.

In a phase-change optical disk, laser heating is completed in a short time, within 1 microsecond, and the maximum heating temperature exceeds the melting point, so that the crystallization through the temperature profile occurs in the neighborhood of the nose temperature Tn where the crystallization time $\tau(Tn)$ is shortest. In the temperature range where the crystallization time is longer by one order of magnitude or more than the crystallization time $\tau(Tn)$ at the nose temperature Tn, the approximation $\tau t/\delta(T) < 1$ can be taken, and so the crystallization rate $\delta X$ is substantially zero. Therefore, this temperature region does not contribute to the crystallization. The temperature region participating in the crystallization where the crystallization time $\tau(T) < (10 \times \tau(Tn))$ is referred to as a crystallization temperature region or zone.

FIGS. 27 to 29 show changes of the nose temperature Tn and the crystallization temperature region relative to changes of the activation energies Ea (0.5 eV, 1 eV, and 2 eV) and the activation constant Q at Tm = 600 C, respectively. As seen from the figures, with the increase of Q, Tn is lowered, while with the increase of Ea, the width of the crystallization temperature region is narrowed.

FIG. 22 shows the power profile of the irradiated laser during the single beam overwrite. This profile consists of two levels of power, a power level $P_2$ continuously light-emitting for crystallizing and a power level $P_1$ for amorphousizing superposed with recording pulses thereon.

FIG. 30A and 30B schematically show the temperature of the recording film when the crystallizing power $P_2$ and amorphousizing power $P_1$ are irradiated in accordance with the laser power profile shown in FIG. 22 and the crystallization rate represented by the previously mentioned formula of JMA. The rotation number of the disk is set at 1800 rpm, the linear speed is set at 10 m/s, and the laser spot diameter is set at 1 μm.

Now, consideration will be given to the passing time required for the recording film to pass the crystallization temperature region in the neighborhood of the nose temperature Tn. In the crystallizing mode where the laser emits light continuously, the time $t_c1$ passing the crystallization temperature region, which is the time when the laser spot passes at the linear speed of 10 m/s, is about 0.1 μs.

On the other hand, in the amorphousizing mode where pulsating power is superposed on the irradiation power $P_2$ of the laser beam, the resulting temperature profile is the temperature profile in the crystallizing mode superposed with the temperature profile corresponding to the pulse component. Since the recording film is melted at the temperature of the melting point or greater, the time required to pass the crystallization temperature region has only to be considered on the cooling process after the melting. Thus, the time $t_c2$ passing the crystallization temperature region is about 0.05 μs, which is about ½ of $t_c1$.

However, unlike the double beam overwrite, the single beam overwrite can not change the laser spot diameter between the amorphousizing mode in which the recording position is made amorphous and the crystallizing mode in which the recording position is made crystalline, the passing time in the crystallization temperature region varies by only about a factor of two between the amorphousizing and crystallizing; thus, it can not greatly vary.

Consideration will be given here about the crystallization rate in the amorphousizing and crystallizing modes. Although the crystallization is strictly represented by the integration of the crystallization rates in accordance with the temperature profile, it can be roughly determined by the $t_c/\tau(Tn)$ ($t_c$: passing time required for the temperature of the recording film to pass the crystallization temperature region in the neighborhood of the nose temperature Tn: crystallization time $\tau(Tn)$ at the nose temperature). With the passing time $t_c > \tau(Tn)$, the crystallization rate is 100% (complete crystalline phase). And, with the passing time $t_c < \tau(Tn)$, the crystallization rate is 0% (complete amorphous phase). The crystallization time $\tau(Tn)$ is previously defined with the recording film, and the passing time $t_c$ varies only by about two as mentioned above. Therefore, the crystallization in the crystallizing and amorphousizing modes in accordance with the power profile of the single beam overwrite as shown in FIG. 22 can not provide the crystallization rate of 100% in the crystallizing mode and that of 0% (amorphous) in the amorphousizing mode, as shown in FIGS. 30A and 30B.

If the recording film having short crystallization time $\tau(T)$ is selected in order to provide the crystallization rate of 100 %, the passing time $t_c$ in the crystallizing mode i.e. $t > \tau(Tn)$ is satisfied. However, since the passing time varies by only two between the amorphousizing and crystallizing modes, the passing time $t_c > :(Tn)$ results also in the amorphousizing mode. Thus, although the amorphous phase is intended to be provided in the recording mode, the crystallization rate at the recording position becomes almost equal to that in the crystallizing mode and thus, there is no difference in the crystallization rate between the crystallizing and amorphousizing modes. Since recording/reproduction is based on the difference in crystallization rate leading to a difference of a reflection coefficient, the absence of a difference in the crystallization rate substantially makes it impossible to record and reproduce signals.

In order to carry out the recording so as to provide the necessary reproduction signal level, it is necessary to set the crystallization time $\tau(Tn)$ of the recording film at a moderately high value ta, which is an intermediate value between the passing time $t_c1$ in the crystallizing mode and the passing time $t_c2$ in the amorphousizing mode ($\tau(Tn) = ta$). Therefore, it is impossible to attain a crystallization rate of 100 % in the crystallizing mode. In FIGS. 30A and 30B $\tau(Tn)$ at the nose temperature Tn is set at 40 nanoseconds, which results in the crystallization rate in the crystallizing mode: 80%
the crystallization rate in the amorphousizing mode: 40%

The conventional single beam overwrite is involved in the above restrictions. Now, explanation will be given for the crystallization rate in the amorphousizing mode and that in the crystallizing mode in the overwrite under the above restrictions.

In the amorphousizing mode, the recording film at the recording position is melted to enter the liquid phase and is recrystallized in an abrupt cooling process from the liquid phase to the solid phase so that its crystallization rate remains constant and is 40%. On the other hand, in the crystallizing mode, the film is not melted, and one round process of the crystallizing mode can not provide a complete crystalline state with the crystallization rate of 100 % so that the influence of the old crystallization rate of the recording position before new crystallization is left as a previous history. If the previous phase at the recording position is crystalline as previous history, the crystallization rate has already reached 80%, and the remaining 20% part of amorphous portion which is not still crystallized is facilitated to be crystallized. The crystallization rate of the amorphous portion (uncrystallized portion) is 80% when the new crystallizing is carried out by once irradiating laser. Thus, the new crystallization rate after having experienced the crystallizing mode becomes 96% (the initial crystallization rate of 80% plus the crystallization facilitating rate of 16% for the uncrystallized portion). If the previous history has experienced the amorphousizing mode just before, the initial crystallization rate is 40%, and the new crystallization rate after having experienced the crystallizing mode this time becomes 88% (the initial crystallization rate of 40% plus the crystallization facilitating rate of 48%).

In this way, in the crystallizing mode, even though the recording film is in a crystalline phase, the film has portions with different crystallization rates of 96% and 88% which depend upon the previous history. This difference leads to incomplete erasing, which gives rise to a problem of providing an insufficient erasing ratio of the old data history in the overwrite.

This problem is particularly noticeable in an optical disk in a CAV (Constant Angular Velocity) system with constant rotating speed in which the linear speed is different in the inner and outer peripheries. The laser irradiation time for crystallizing the recording position is limited within the time t of a laser spot passing through the recording position. The time t is defined by t=(laser spot diameter)/(linear speed), and the laser spot diameter is set constant. In the CAV disk, the linear speed in the outer periphery is relatively large so that the laser irradiation time for crystallizing the recording position is shortened. Thus, the crystallization in the crystallizing mode can not be sufficiently facilitated so that the erasing ratio is disadvantageously lowered, particularly in the outer periphery. Further, in the prior art, the irradiation power $P_1$ in the amorphousizing mode and the irradiation power $P_2$ in the crystallizing mode are set at 20 mW and 10 mW, respectively ($P_1/P_2=2$) so that the width of the heating region at recording positions is varied in a track width direction for the amorphousizing mode and crystallizing mode. This also leads to incomplete erasure.

SUMMARY OF THE INVENTION

An object of the present invention is to provide a method and an apparatus for optically recording information and a recording medium therefor which permit overwriting using a single beam with a high erasing ratio.

In order to attain the above object, the operation point of irradiated laser power is set for both the amorphousizing mode and the crystallizing mode at a power which permits a recording film to be heated to a temperature of its melting point or more, and also the heat dissipating property of the recording film and its neighboring material is adjusted so that the cooling time after melting (the passing time required to pass the crystallization temperature region of the recording film in a cooling process) is varied by the irradiated power. Further, the crystallization time of the recording film is also set within a range of controlling the cooling time by the above laser power so that a phase change optical information recording medium has, as its phase change property during laser irradiation, an amorphousizing region and a recrystallizing region. Information is recorded through the phase change between the amorphousizing region and the recrystallizing region. The recording or writing process is performed through steps 101 to 103 in FIG. 1, as described later.

The recrystallizing region will be explained below. In FIG. 23, the abscissa represents a laser irradiation time $t_p$ (pulse width), and the ordinate represents laser irradiation power P. Then, the phase change state of the recording film consisting of an unchanging region, a recrystallizing region, an amorphousizing region, and a damaged region due to excessive heating is determined in accordance with $t_p$ and P. Each region basically depends on the temperature of the recording film. Arranged from the low power side are the unchanging region, the crystallizing region over a crystallization boundary line $l_1$ (corresponding to the temperature Tn), the amorphousizing region over an amorphousizing boundary line $l_2$ (corresponding to the melting point Tm in the region with the pulse width $t_p$ of 10 ns or less), and the damaged region over a damage boundary line $l_3$. Since the temperature reached is substantially proportional to the irradiation energy (t×P), each boundary line is a line with t×P=constant, having a rightwardly descending tendency. With the increase of the irradiation time, thermal diffusion occurs in the increased irradiation time so that in order to equally hold the reached temperature, the larger the power, the longer is required the irradiation time. Thus, the boundary line has, on the longer irradiation time side, a more moderate gradient than the line with t×P−constant.

Here, as mentioned above, by adjusting the crystallization time and the cooling time of the recording film, the amorphousizing boundary line $l_2$ with $t_p$: short which is rightwardly descending can be made rightwardly ascending in the region with $t_p$: long (FIG. 3A).

Now, the line $l_4$ is obtained by extrapolating the amorphousizing boundary line $l_2$ in the region with $t_p$: short to the region with $t_p$: long so that it is parallel to the crystallizing boundary line $l_1$. This extrapolating boundary line $l_2$ (indicating that the recording film has reached its melting point) with $t_p$: short is substantially equal to the extrapolation in parallel to the crystallizing boundary line $l_1$ so that it provides the constant reached temperature and so can be regarded as a boundary where the temperature of recording film reaches its melting point (hereinafter referred to as a melt line).

Incidentally, although the region partitioned by the melt line and the amorphousizing boundary line causes crystallization, it provides different operations. More specifically, the crystallization below the melt line only means that crystallization is facilitated in the solid state, whereas the crystallization above the melt line means that the recording film is once melted at a temperature exceeding the melting point to be its liquid state and recrystallized in the cooling process. The region above the melt line is referred to as the recrystallizing region.

The operation of the present invention will be roughly explained below. The recrystallization depends on the ratio of the passing time $t_c$ (time required to pass the crystallization temperature region in the cooling process from the melting point) to the crystallization time $\tau(Tn)$, i.e., $t_c/\tau(Tn)$. With $t_c/\tau(Tn)$ : large ($>1$), the film is easily recrystallized since it is gradually cooled from the liquid phase, whereas with $t_c/\tau(Tn)$ : small ($<1$), the film is difficult to recrystallize since it is abruptly cooled from the liquid phase and is quenched to be amorphous.

The passing time $t_c$ can be represented by the sum of a first passing time factor $t_c\alpha$, which is defined by the heat dissipating time constant depending on the medium composition, a second passing time factor $t_c\beta$, which is defined by the laser irradiation power, and a third passing time factor $t_c\gamma$, which is defined by the change of cooling property where the thermal diffusion changes in accordance with the irradiation time, i.e., $t_c = t_c\alpha + t_c\beta + t_c\gamma$. The first passing time factor $t_c\alpha$ defined by the heat dissipating constant is large as the thermal capacity of the recording film is small and the thermal conduction of the neighboring material is high. Further, if the irradiation power is enhanced with the heat dissipating constant fixed, the temperature change per unit time is increased so that the time required to pass the crystallization temperature region is decreased. Then, the second passing time factor $t_c\beta$ becomes small. Moreover, if the irradiation time $t_c$ is increased, the effective thermal capacity appears to have been increased due to the thermal diffusion from the laser spot portion during irradiation. Then, the effective heat dissipating constant becomes large and the cooling speed becomes low so that the third passing time factor $t_c\gamma$ becomes large.

The recrystallization state depends on which of $t_c\alpha$, $t_c\beta$, and $t_c\gamma$ is dominant in the ratio of the passing time $t_c$ to the crystallization time $\tau(Tn)$.

In the single beam overwrite providing a high erasing ratio, it is required that the recording film at recording positions be melted while the irradiation laser power profile is controlled to cause a phase change between the amorphous state and the recrystallization state.

To this end, it is necessary to make small the first passing time factor $t_c\alpha$, which is a fixed component depending on the disk composition, and to make dominant the second and third passing time factors $t_c\beta$ and $t_c\gamma$. As mentioned above, if the heat dissipating property is enhanced in the disk composition, the heat dissipating constant can be decreased, and so the first passing time factor $t_c\alpha$ can be decreased.

In the disk composition with enhanced heat dissipating property, $$t_c/\tau(Tn) = (t_c\beta + t_c\gamma)/\tau(Tn).$$

As mentioned previously, if the power is increased, $t_c\beta$ is decreased and if the irradiation time is increased, $t_c\gamma$ is increased. Thus, $(t_c\beta + t_c\gamma)$ can be controlled using the power profile. It is assumed that the average value of $(t_c\beta + t_c\gamma)$ in a controllable range is $t_a$, and in a recording film having the crystallization time $\tau(Tn)$ equal to $t_a$, the value of $(t_c\beta + t_c\gamma)/\tau(Tn)$ can be varied centering about 1 by changing the power profile of the irradiation laser.

With $(t_c\beta + t_c\gamma)/(Tn) > 1$, the recording film will be recrystallized since it is gradually cooled after it is With $(t_c\beta + t_c\gamma)/:(Tn) > 1$, the recording film will be made amorphous since it is abruptly cooled after it is melted.

FIG. 2 shows the temperature profiles of a recording film when a metallic film with enhanced heat dissipating property is provided in thermal coupling with the recording film so as to decrease $t_c\alpha$. When $t_c\alpha$ is decreased, the thermal response speed during laser irradiation is enhanced so that the temperature profile can respond to the power profile of a laser spot itself in Gaussian distribution when the laser spot passes. Thus, the temperature profile is also similar to the Gaussian distribution. Specifically, temperature changes slowly around the peak of the temperature profile and changes rapidly around the middle thereof. When low power is irradiated, as seen from part (A) of FIG. 2, the temperature of the recording film passes the crystallization temperature region where temperature change is moderate, so that the passing time $t_c3$ during low power irradiation becomes long. Then, the recording film is cooled slowly from the liquid phase and recrystallized. On the other hand, when high power is irradiated, as seen from part (B) of FIG. 2, the temperature of the recording film passes the crystallization temperature region where temperature change is abrupt, so that the passing time $t_c4$ is short during high power irradiation. Then, the recording film is cooled quickly from the liquid phase and is made amorphous.

The condition of $(t_cB + t_c\gamma)/\tau(Tn) = 1$ is a criterion of the boundary between the crystallized state and the amorphous state. This boundary will be considered in relation to irradiation power and time below. If the power is increased, $t_c\beta$ is decreased, and if the irradiation time is lengthened, $t_c\gamma$ is increased. Thus, the power satisfying the condition $(t_c\beta + t_c\gamma) = \tau(Tn)$, when the irradiation time is long, is higher than that when the irradiation time is short. Therefore, with an abscissa of an irradiation time and an ordinate of power, the boundary partitioning the recrystallizing region and the amorphousizing region is a rightwardly ascending line. Further, by adjusting the irradiation power profile to increase the change of $t_c\beta$ and also adjusting thermal diffusion to restrict $t_c\gamma$ so as to make $t_c\beta$ more dominant, the gradient of the boundary line between the recrystallizing region and the amorphousizing region can be made moderate. In contrast, by restricting a change of $t_c\beta$ so as to make $t_c\gamma$ more dominant, the gradient of the boundary line can be made abrupt.

In this way, a recording medium with a recrystallizing region and the adjusted gradient of the boundary between it and an amorphousizing region can be provided. Then, if the single beam overwrite is performed between the recrystallizing region and the amorphousizing region, all the operating points are located at the temperatures exceeding the melting point. Thus, the recording film of the recording position is melted and experiences the liquid phase. Therefore, the difference in crystallization rate among the previous state of the operating points, which is a cause of incomplete erasing during overwrite, can be removed. Through melting, the recording film of the recording position is subjected to perfect erasing, thereby providing a high erasing ratio or high erasing capability.

An example of the property having a recrystallizing region in a phase change optical information recording medium is disclosed in the previously identified reference, "SINGAKU GIHO" Vol. 87 No. 310 CPM87-80. However, there is not disclosed therein the use of the recrystallizing region and a technique of adjusting the recording medium to use the recrystallizing region, thereby remarkably improving the erasing ratio. There is only disclosed a three-beam overwrite technique which is a previous stage of the use of the recrystallizing region.

Further, it should be noted that the above reference makes division of the phase change in a static system and does not consider that the crystallization which is based on delicate thermal balance should be considered together with thermal propagation in the recording medium before and after laser irradiation in a moving system.

BRIEF DESCRIPTION OF THE DRAWINGS

FIG. 5 is a flow diagram of the recording process in accordance with one embodiment of the present invention;

FIGS. 21 to 23 are diagrams useful for explaining the prior art, in which FIG. 21 is a sectional view of a prior art structure and also shows a relation between an optical disk and laser beam irradiation, FIG. 22 is a graph of the profile of irradiation power, and FIG. 23 is a characteristic graph of the phase change of a recording film;

DESCRIPTION OF THE PREFERRED EMBODIMENTS

Figure 1:
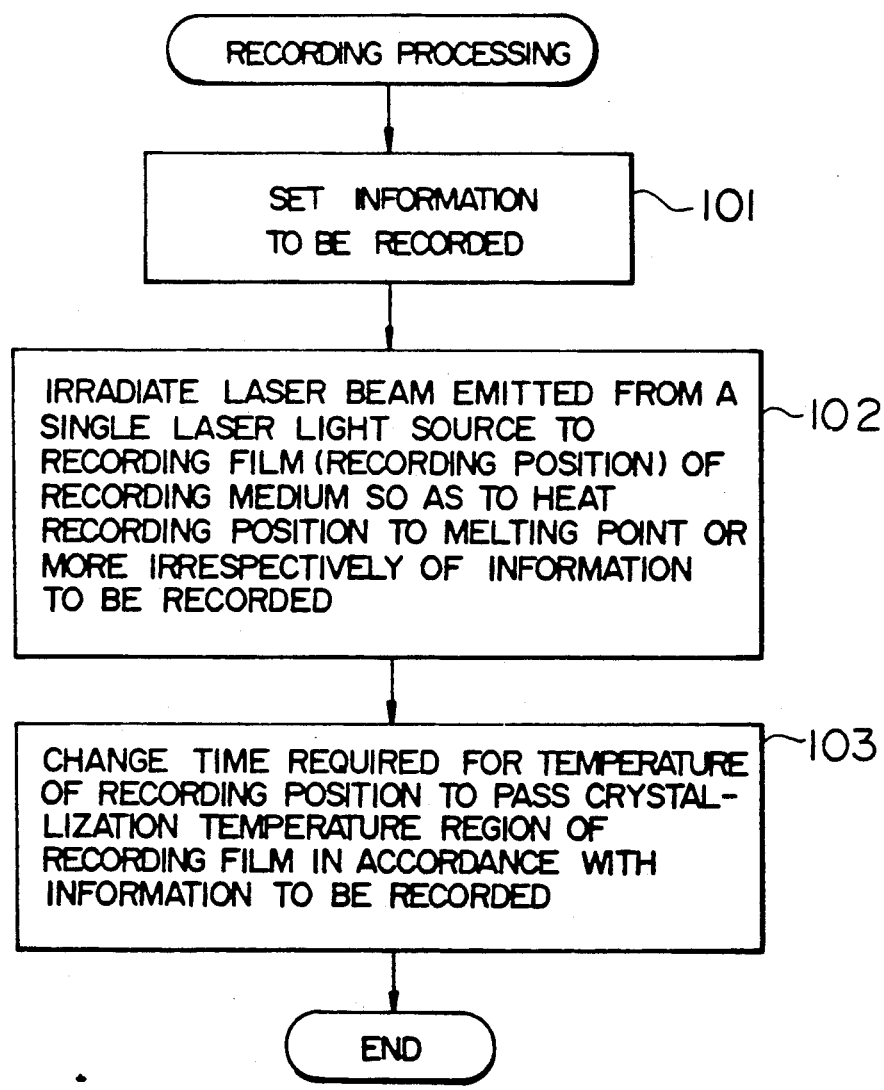
FIG. 1 is a flow diagram of the basic steps of the present invention.

Referring to the drawings, explanation will be given for several embodiments. It should be now noted that the present invention can be applied to an optical disk in thin film structure disclosed in U.S. Application being filed on the basis of Japanese Patent Application No. 63-154743 filed June 24, 1988 assigned to the present assignee.

Figure 3A:
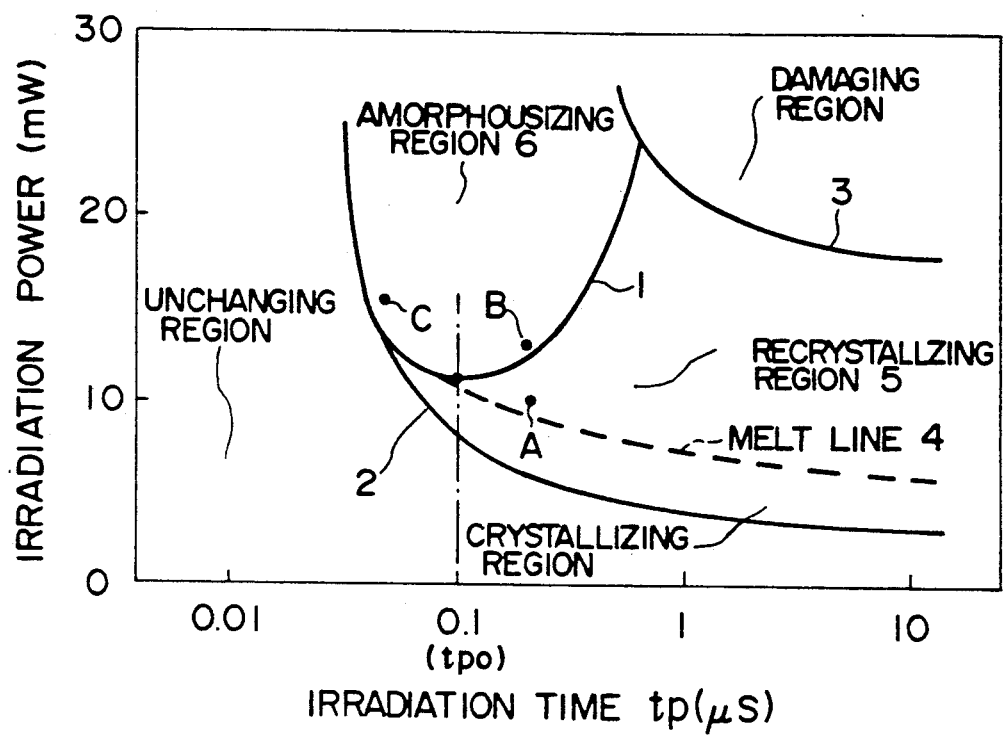
FIGS. 3A and 3B are characteristic graphs for explaining one embodiment of the present invention.

FIG. 3A is a characteristic diagram of phase change regions in relation to laser irradiation power and irradiation time for an optical disk in accordance with one embodiment of the present invention. Measurements are made while changing a disk rotation number, radius, and laser irradiation power P using an optical pick-up having a laser spot diameter of $\phi = 1$ μm. The irradiation time $t_p$ is set as follows $$t_p = \phi \times 60/2\pi RN$$

where
 $\phi$ laser spot diameter
 R: radius
 N: rotation number speed (rpm)

The boundary line of an amorphousizing region is indicated by a reference numeral 1, that of a crystallizing region is indicated by a numeral 2, that of a damaged region is indicated by a numeral 3, and a melt line is indicated by a numeral 4.

The amorphousizing region boundary line 1 is lowest at the laser irradiation time $t_p = t_{po} = 0.1$ μs and rightwardly ascending at $t_p > 0.1$ μs. The melt line 4 is a line obtained by extrapolating the amorphousizing region boundary line 1 at $t_p = 0.05$ μs into the irradiation time zone of $t_p > 0.1$ μs in parallel to the crystallizing region boundary line 2. A recrystallizing region 5 is located between the melt line 4 and the amorphousizing region boundary line 1.

Figure 3B:
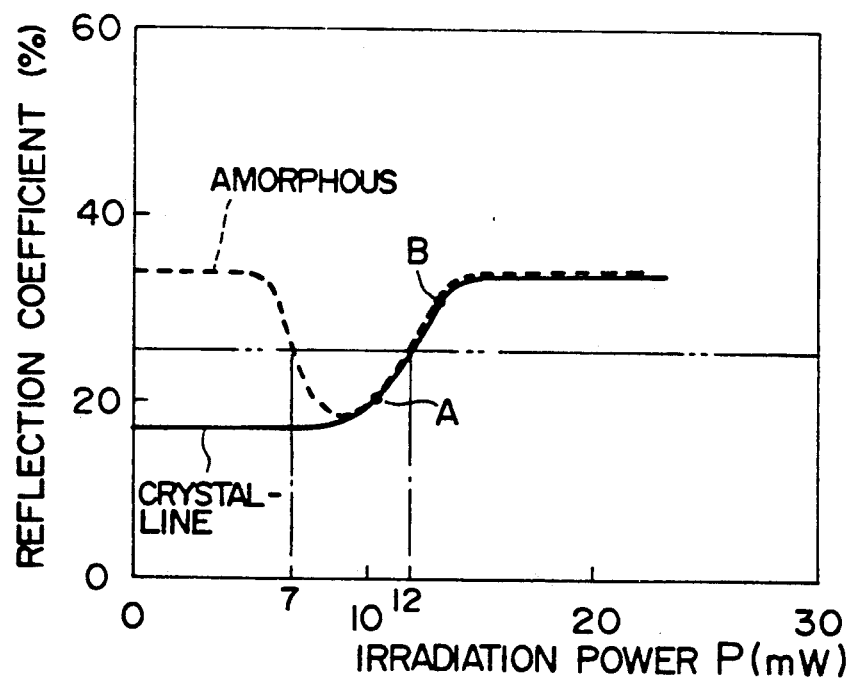

FIG. 3B is a graph of the relation between the irradiation power P and the reflection coefficient when the irradiation power P is varied so as to pass the recrystallizing region 5 with $t_p = 0.2$ μs (N = 1800 rpm, R = 30 mm in FIG. 3A). The solid line is a graph showing when the initial state is in a crystalline state, and the broken line is a graph showing when the initial state is in an amorphous state. The reflection coefficient starting from the crystalline state starts to increase at the irradiation power of 9 mW and is saturated at that of 14 mW. The reflection coefficient starting from the amorphous state starts to decrease at an irradiation power of 6 mW, becomes the reflection coefficient corresponding to a crystalline state at an irradiation power of 9 mW, starts to increase there again, and is saturated at an irradiation power of 14 mW or more, thus providing a reflection coefficient corresponding to the amorphous state again. Now assuming that the intermediate level between the reflection coefficients corresponding to the crystalline state and the amorphous state is a boundary of phase change, then 7 mW is crystallizing power, 12 mW is amorphousizing power, and 9 mW is melting power $P_M$.

Figures 4A, 4B:
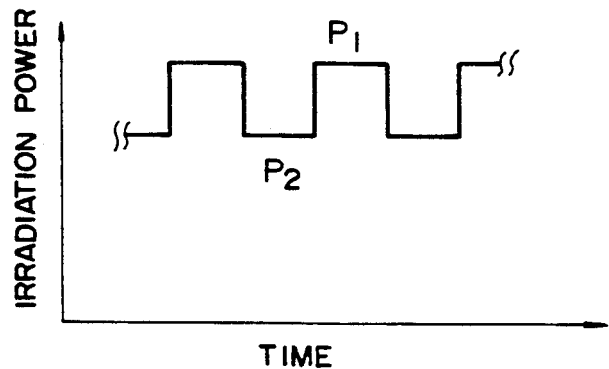
FIGS. 4A and 4B are a table showing the comparison result of a carrier-to-noise ratio (CNR) and an erasing ratio between the present invention and the prior art, and a graph showing the profile of irradiation power, respectively.

FIG. 4A shows a comparison between embodiments (examples) of the present invention and examples of the prior art, characteristics of CNR (ratio of carrier signal level to noise) and erasing ratio when single beam overwrite is performed between the frequency of 2 MHz and 3 MHz; the erasing ratio means the amount of the 2 MHz signal that is erased when a 3 MHz signal is written on the 2 MHz signal.

Example 1 is the case where the single beam overwrite is performed between an amorphousizing operation point B in the amorphousizing region and a recrystallizing operation point C in the recrystallizing region in Figs. 3A and 3B, the first irradiation power $P_1 = 12.5$ mW (high power) and the second irradiation power $P_2 = 9.5$ mW (low power) both of which are higher than the melt power $P_M = 9$ mW which is capable of heating the recording position to the melting point or more, and the irradiation time $t_p = 0.2$ μs for the irradiation with both powers $P_1$ and $P_2$ in the irradiation power profile.

Figure 2:
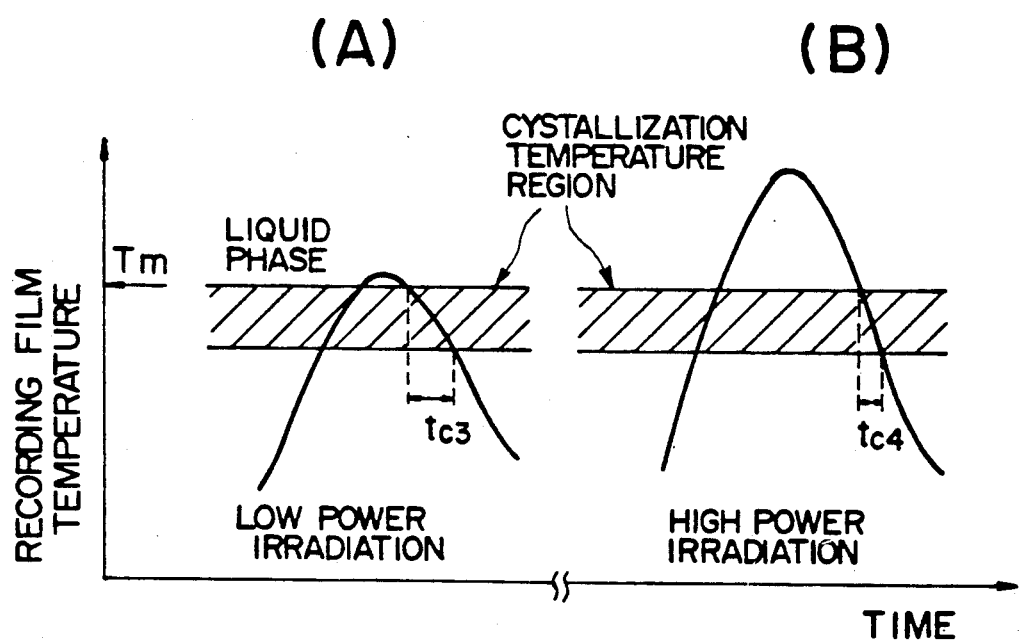
FIG. 2, consisting of (A) and (B) show the relation between the temperature profiles of the recording position and high and low irradiation power, respectively.

The operation of selecting the phase (state) of a recording position between the amorphous state and the crystal state, as explained in connection with FIG. 2, is implemented by changing the irradiation power so that the passing time $t_c$ required to pass the crystallization temperature region is short during high power irradiation ($t_c4$) and long during low power irradiation ($t_c3$) FIG. 5 shows steps for implementing this operation. Accordingly, a high CNR of 49 dB can be obtained, and also a high erasing ratio of 41 dB, which is due to the fact that the operation point is set at a temperature or the melting point or more. can be obtained.

Example 2 of FIG. 4A will be explained. In this example, the second irradiation power $P_2$ for crystallizing is the same as in Example 1 ($P_2 = 9.5$ mW (A point)). On the other hand, the first irradiation power $P_1$ for amorphousizing is set at $P_1 = 16$ mW. Recording is carried out at the C point using pulses with a reduced duty factor so as to provide the first irradiation time for amorphousizing $t_p1 = 50$ ns which is shorter than the second irradiation time for crystallizing $t_p2 = 0.2$ μs. Single beam overwrite is performed between the recrystallizing region and the amorphousizing region which is not located above the recrystallizing region.

Figure 6:
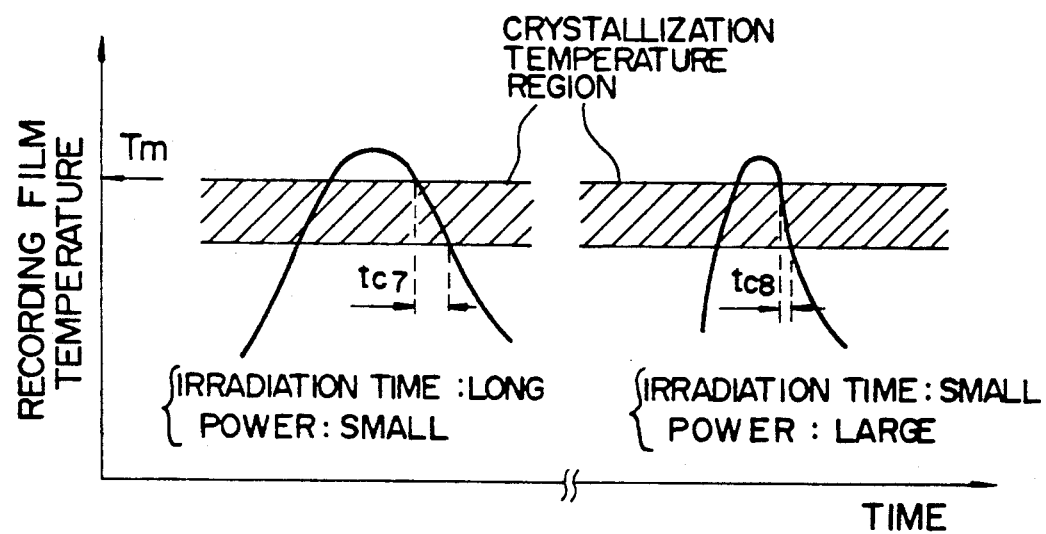
FIG. 6, consisting of (A) and (B), presents temperature profiles for explaining the recording method in accordance with a second embodiment of the present invention.

The operation in this example will be explained with reference to the temperature profile of a recording film as shown in FIG. 6.

Figure 7:
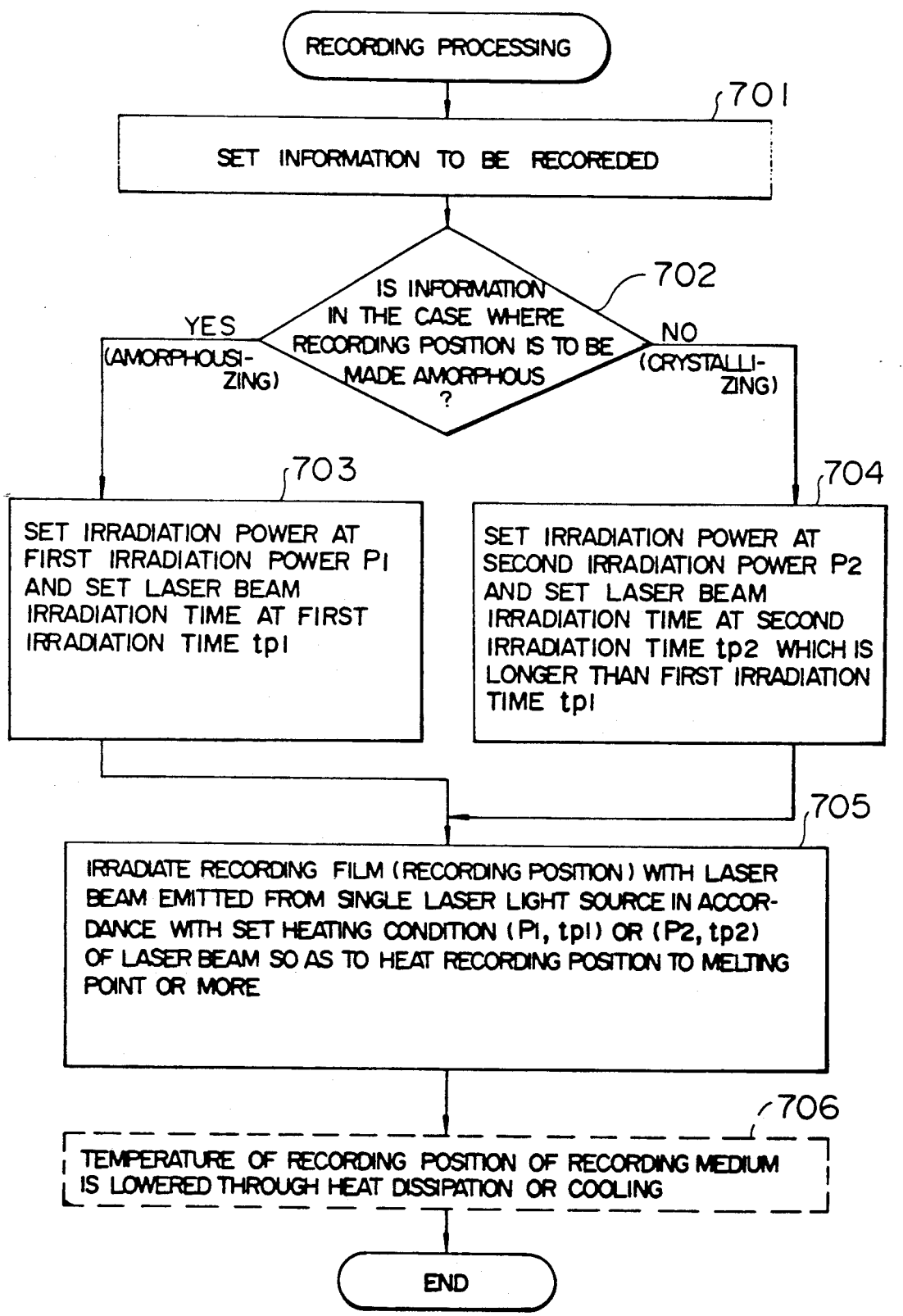
FIG. 7 is a flow diagram of the recording process in accordance with the second embodiment of the present invention.

Part (A) of FIG. 6 shows the same temperature profile with the same laser power and irradiation time as that of Example 1 shown in FIG. 4A. In the temperature profile shown in part (B) of FIG. 6, the irradiation time is decreased and the power is increased so that the maximum temperature of the recording film reaches the same temperature as in part (A) of FIG. 6. In this case, the temperature of the recording film abruptly decreases since due to the short irradiation time, laser irradiation stops before the laser spot passes the recording position. On the other hand, the temperature profile of part (A) of FIG. 6 accords with the passing of the laser beam and exhibits a gradual temperature fall under the influence of the power distribution of the laser beam spot. Thus, in the temperature profile of part (A) of FIG. 6, with the low power and long irradiation time, the passing time $t_c1$ is long, whereas in the temperature profile of the high power and short irradiation time, the passing time $t_c8$ is short. Therefore, by controlling the passing time between $t_c7$ and $t_c8$, the recording film at the recording position can be subjected to the phase change between a crystalline state and an amorphous state. FIG. 7 shows steps 701 to 705 for recording information by this recording technique (step 706 is optional).

Accordingly, in Example 2, of FIG. 4A, a CNR of 52 dB and an erasing ratio of 40 dB can be obtained. Since the operating points are set for both amorphousizing and crystallizing modes at the temperature of the melting point or more in Example 1, such a high erasing ratio can be obtained. Further, since the recording in the amorphousizing mode is carried out in a shorter irradiation time than Example 1 to increase the cooling speed thereby to facilitate the amorphousizing so as to increase change of the reflection coefficient, such a high CNR can be obtained.

In Example 1, the time of the laser beam spot passing the recording position is 0.2 μs whereas the recording laser irradiation time with the signal at 2 MHz is 0.25 μs (duty factor : 50%). This means that pulsative waveforms as well as long pit signals can be recorded. In Example 2, it will be understood that pulses can be recorded having a pulse width of 0.05 μs, which is shorter than the passing time 0.2 μs of the beam spot. Thus, by adjusting part of the amorphousizing region boundary line located above the recrystallizing region so that it is a gradually ascending line, the range of the length of recordable pits can be extended.

Figure 8:
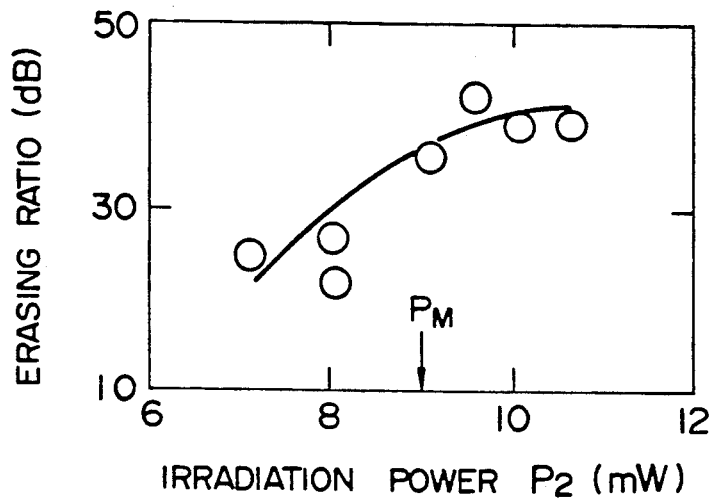
FIGS. 8 and 9 are a characteristic graphs of irradiation power $P_2$ vs erasing ratio and of the ratio of irradiation power $P_1$ to $P_2$ vs the erasing ratio respectively.

The setting of the crystallizing power (second irradiation power) $P_2$ is not restricted to $P_2 = 9.5$ mW. FIG. 8 is a graph of $P_2$ vs the erasing ratio. As seen from the figure, at a power exceeding $P_2 = 9$ mW, which provides a recrystallizing region, an erasing ratio exceeding 30 dB can be attained. Therefore, $P_2$ may be set so as to permit the operation in the recrystallizing region exceeding the power $P_M$ on the melt line.

The conventional Example 1 is directed to the case where the single beam overwrite is performed to provide a phase change between the crystallizing region (but not the recrystallizing region) and the amorphousizing region setting the irradiation power in the crystallizing mode at a third power $P_3 = 8$ mW which can not heat the recording position to the melting point or more, and the first irradiation power in the amorphousizing mode $P_1 = 14$ mW. In this case, the recording operation in the crystallizing mode is at a temperature lower than the melting point so that the previous history cannot be removed, and so a high CNR of 52 dB can be obtained but the erasing ratio is as low as 27 dB.

The conventional Example 2 is directed to the case where recording in the amorphousizing mode is carried out with a short irradiation time tp as in Example 2. In this example, more abrupt cooling facilitates the amorphousizing so that the CNR is enhanced to 54 dB, whereas the erasing ratio is greatly lowered to 20 dB. The conventional examples, in which there is a great difference in the crystallizing rate between the amorphous portion and the crystal portion in the previous history and the previous history cannot be removed, provides a high CNR but also a decreased erasing ratio.

Examples 1 and 2 of the present invention provide substantially equal erasing ratios and have an advantage of providing a high erasing ratio irrespectively of the irradiation time $t_p$.

Further, in the conventional Example 2, the first erasing power $P_1$ for amorphousizing must be increased to a value as high as 16 mW for the recording in the amorphousizing mode with a short irradiation time, whereas the irradiation power $P_3$ for crystallizing used is as low as 8 mW. Then, the ratio $P_1/P_3$ is large so that the width of the heating region with an equal laser power density is greatly shifted between the recording portion in the amorphousizing mode and the recording portion in the crystallizing mode and winds on a recording track. This winding also promotes incomplete erasure.

On the other hand, in the Examples of the present invention, a recrystallizing region is formed as an operating property to place operating points in the crystallizing mode therein. The recrystallizing region is set on the side of higher power than only a crystallizing region so that the ratio $P_1/P_2$ can be, decreased, and so incomplete erasure can be avoided.

Figure 9:
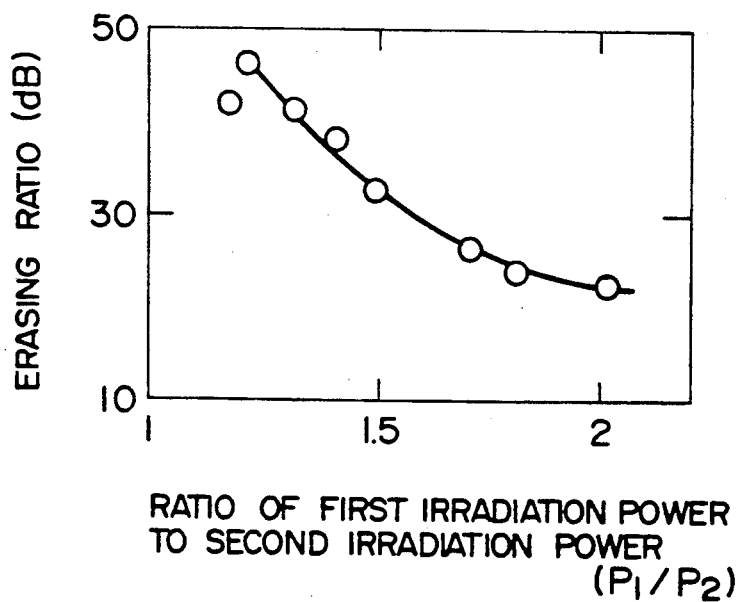

FIG. 9 shows a relation between the ratio $P_1/$ and the erasing ratio with $P_2=9-10$ mW. Particularly, with $P_1/P_2 < 1.5$, the erasing ratio of 30 dB or more can be obtained.

Figure 10:
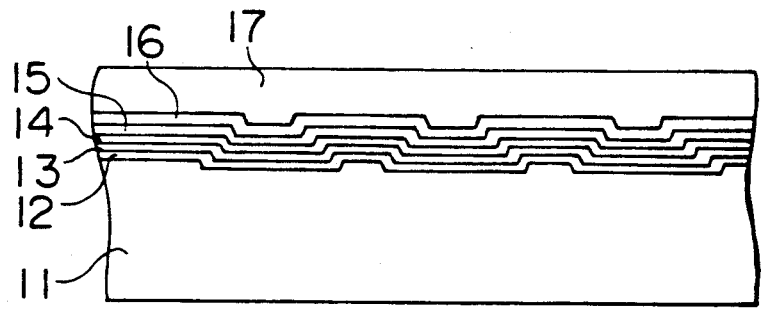
FIGS. 10, 11 and 13 are each a sectional view of the structure of the recording medium in accordance with embodiments of the present invention, respectively.

FIG. 10 shows the arrangement of an optical disk in accordance with the above examples of the present invention.

The optical disk is composed of an aluminium nitride film (AlN film) 12, a recording film 13, another AlN film 14, an gold (Au) film 15, a further AlN film 16, and an ultraviolet ray setting resin film 17 stacked successively on a substrate 11 in the following arrangement. First, the AlN film 12 having a thickness of 70 nm is formed as an interference film on the substrate with a tracking guide, of glass, having a diameter of 130 mm through a sputtering technique. The recording film 13, made of a tertiary system of indium-antimony-tellurium (In-Sb-Te), having a thickness of 50 nm is formed thereon through a sputtering technique. Another AlN film 14 having a thickness of 70 nm is formed thereon through puttering. Further, the Au film 15 having a thickness of 100 nm is thereon formed as a reflection film through a sputtering technique. Finally, the further AlN film 16 as a protection film having a thickness of 100 nm and the ultraviolet ray setting resin film 17 having a thickness of 10 μm are spin-coated thereon.

Although the above example relates to the case where at the rotation number of the disk N = 1800 rpm, and the distance between the rotation center and the recording position (i.e. rotation radius) R = 30 mm i.e., the linear speed at the recording position $V \approx 6$ m/s, this linear speed may be varied in the present invention.

EXAMPLE 3

Figure 11:
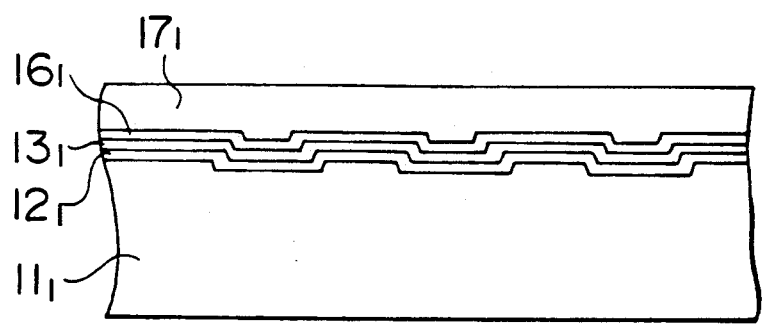

FIG. 11 shows the arrangement of an optical disk when the recrystallized region is set on the side of longer laser irradiation time so that the linear speed V of a CD (compact disk), etc. corresponds to a system having a linear speed of V = 1 m/s. More specifically, a tantalum pentaoxide ($Ta_2O_5$) film having a thickness of 70 nm is formed as an interference/thermal protection film on an injection-molded replica substrate 111 formed of polycarbonate and having a tracking guide; a recording film $13_1$, made of a tertiary system of antimony-selenium-bismuth (Sb-Se-Bi), having a thickness of 60 90 nm is formed thereon; and another $Ta_2O_5$ film $16_1$ having a thickness as a protection film is formed thereon. These films are formed through the sputtering techniques. Further, an ultraviolet ray setting resin film $17_1$ having a thickness of 10 μm is spin-coated on film $16_1$.

Figure 12A:
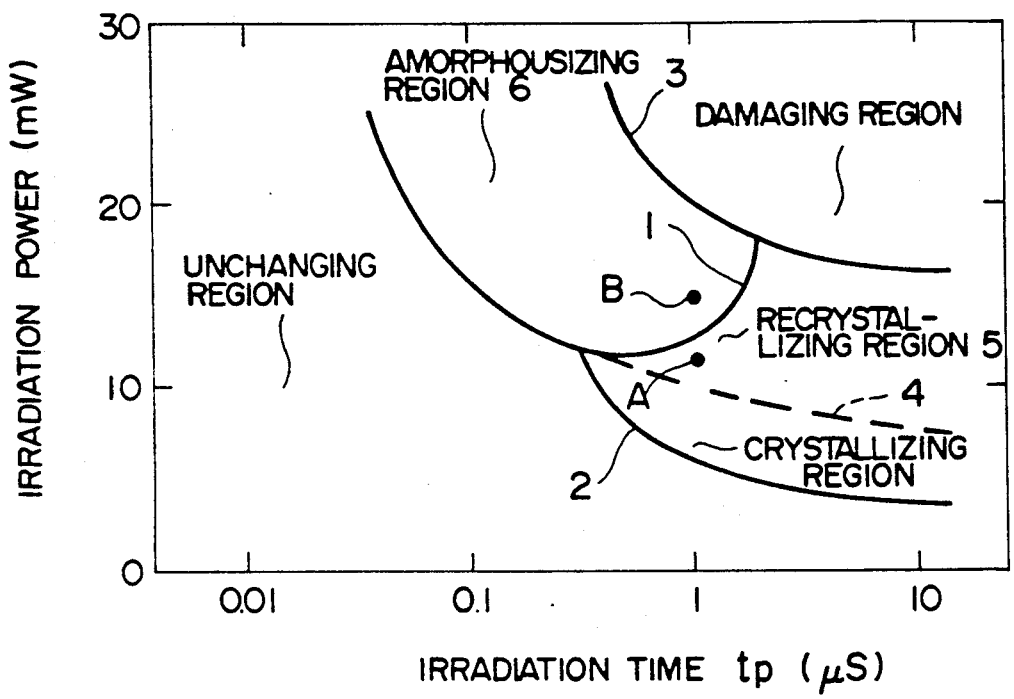
FIGS. 12A and 12B are a characteristic graph of a phase change and of laser irradiation power vs reflection coefficient in an optical disk in accordance with embodiments of the present invention, respectively.

FIG. 12A shows partition of the phase change regions in the above optical disk. In the above optical disk, the thermal protection film is made of $Ta_2O_5$ which has lower thermal conductivity than AlN, and the recording film is made of Sb-Se-Bi which requires a longer crystallizing time than In-Sb-Te. Therefore, the recrystallizing region is shifted on the side of longer laser irradiation time as compared with FIG. 3A, and the recrystallizing region above which an amorphousizing region is located can be formed in the range of an irradiation time of 0.3 μs – 2 μs.

Figure 12B:
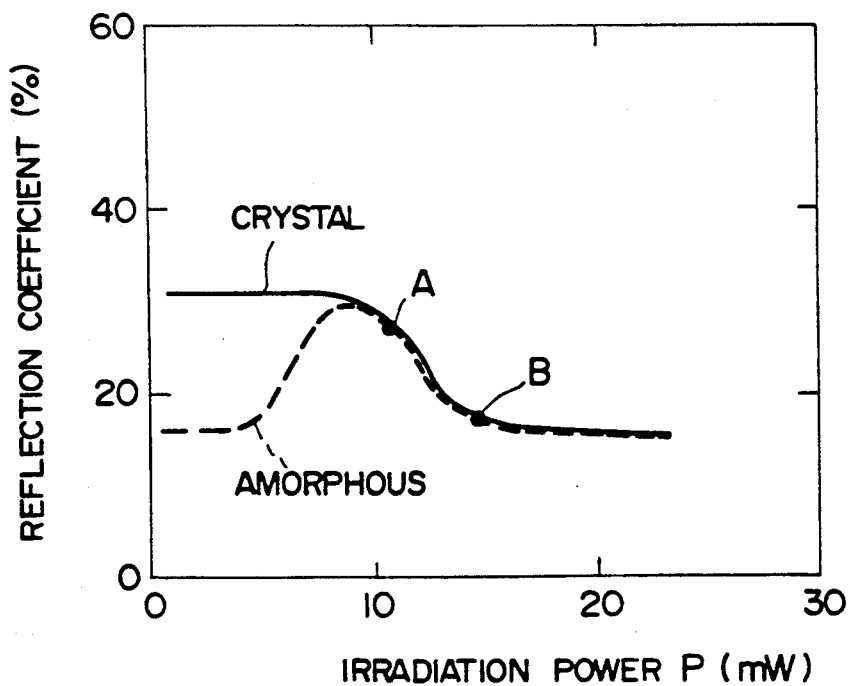

FIG. 12B shows the relation between laser irradiation power P and a reflection coefficient at an irradiation time of 1 μs (linear speed : 1 m/s). The solid line indicates the case where the initial state is crystalline, and the broken line indicates the case where the initial state is amorphous. The reflection coefficient in the amorphous state and the crystalline state in this disk is the reverse of the case of FIG. 3B, namely, the crystalline state has a larger reflection coefficient. This is determined by the reflective index, the absorptive coefficient and the thickness of the Sb-Se-Bi film and the wavelength (=830 nm) of the laser, and the present invention does not depend on the value of the reflection coefficient in the amorphous and crystalline states.

As in the case of FIG. 3B, the crystallizing power is 6 mW, the melt power is 10 mW, and the amorphousizing power is 13 mW. The operating points in the single beam overwrite are set at the amorphousizing power (first irradiation power) $P_1 = 15$ mW (B point) and the crystallizing power (second irradiation power) $P_2 = 11$ mW (A point) which are greater than the melt power. And the overwrite is repeated at frequencies of 0.5 MHz and 0.7 MHz.

Since the operating points are set at a power exceeding the melt power, melting the recording film of the recording position, the previous history can be removed, thereby providing a high CNR of 48 dB and a high erasing ratio of 40 dB. Similarly to Examples 1 and 2, this example permits recording to be performed with the frequency and the pulse width (and so irradiation time t) being changed, thereby providing a high CNR and a high erasing ratio at a low linear speed.

EXAMPLE 4

Figure 13:
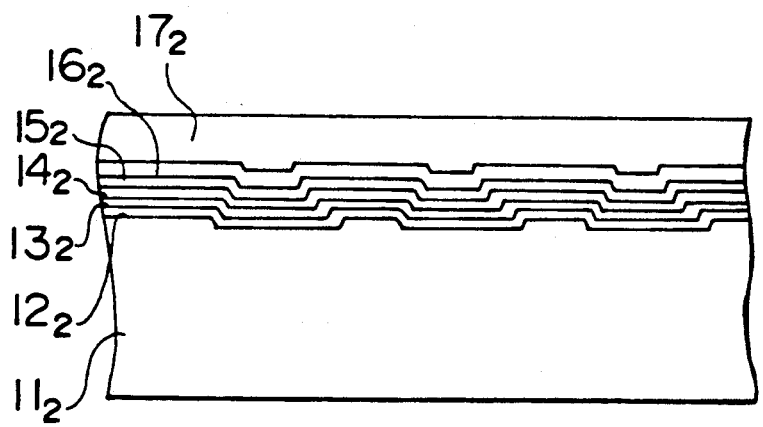

FIG. 13 shows the arrangement of an optical disk which is adapted for a use in which the linear speed varies in the range of 5 m/s to 12 m/s in the inner and speed: constant) system for data storage. A silicon nitride (SiN) film $12_2$ having a thickness of 70 nm is formed as an interference film on a glass substrate $11_2$ having a tracking guide, a tertiary InSbTe system film $13_2$ having a thickness of 60 nm is formed as a recording film thereon; another SiN film $14_2$ having a thickness of 150 nm is formed thereon; a copper (Cu) film $15_2$ having a thickness of 80 nm is formed as a reflection film thereon; and a further SiN film 16 having a thickness of 100 nm is formed thereon. These films are formed through the sputtering techniques. Finally, an ultraviolet ray setting resin film $17_2$ having a thickness of 100 μm is spin-coated thereon.

The arrangement of the disk shown in FIG. 13 is basically the same as the disk (FIG. 10) used in Examples 1 and 2. However, the former is different from the latter in the following points. For adjusting the crystallizing region, as a material of the interference film in place of AlN, SiN, which has substantially the same reflactive index as AlN but, lower thermal conductivity than AlN, is used to advance the start of the recrystallization. Conversely, as a material of the reflection film in place of gold, copper, which has a reflection coefficient equal to and a higher thermal conductivity than gold, is used in order to swiftly cool the recording film heated by laser irradiation propagating to the reflection film $15_2$ through the SiN film $14_2$, thereby restraining the recrystallization due to the irradiation with high power and for long time. Thus, abrupt ascending of the boundary between the recrystallizing region and the amorphousizing region is avoided to extend the width of the recrystallizing region above which the amorphousizing region is located in the direction of irradiation time.

Figure 14A:
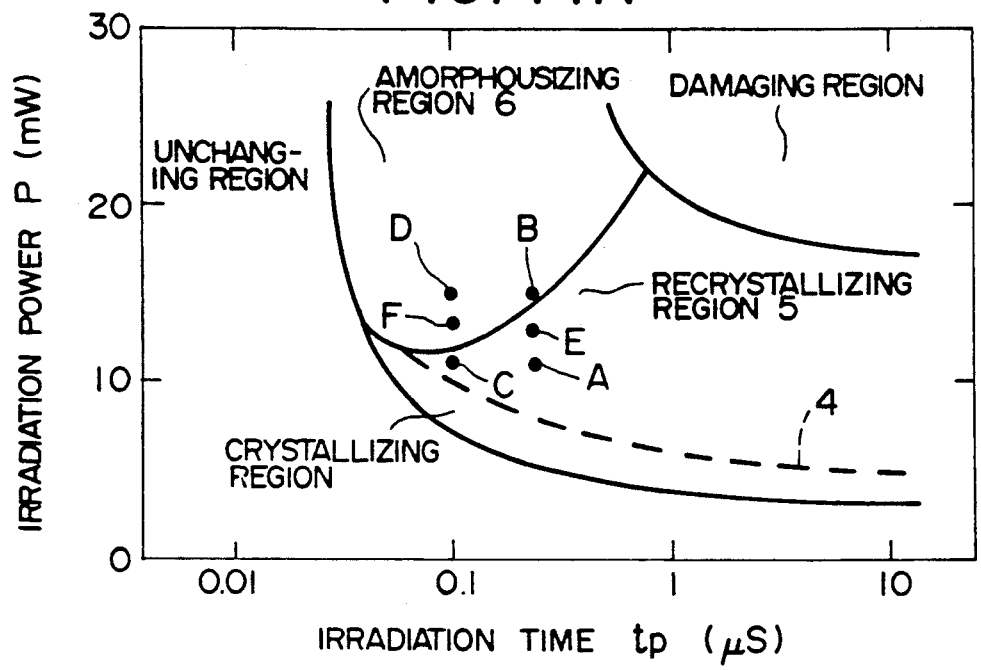
FIGS. 14A is a characteristic graph of a phase change.

FIG. 14A shows partition of phase change regions in the above disk. The amorphousizing region boundary line exhibits a rightwardly gradually ascending curve on the side of longer irradiation time than 0.08 $\mu$s. Reference numeral 4 denotes a melt line, 5 denotes a recrystallizing region, and 6 denotes an amorphousizing region. The amorphousizing region is located above the recrystallizing region in a wide range of irradiation time of 0.08 $\mu$s—1 $\mu$s.

Figure 14B:
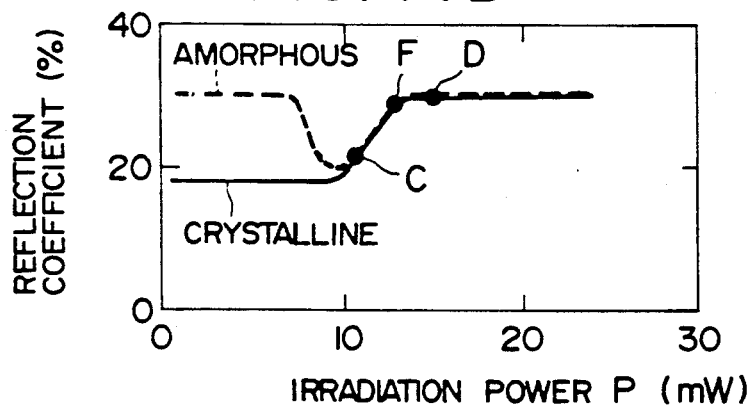
FIGS. 14B and 14C are characteristic graphs of laser irradiation power vs a reflection coefficient in an optical disk in accordance with an embodiment (example 4) of the present invention.

FIG. 14B shows the relation between irradiation power and reflection coefficient with an irradiation time of 0.1 $\mu$s (corresponding to a laser spot diameter of 1 $\mu$m, a rotation number of 1800 rpm and a radius of 60 mm).

Figure 14C:
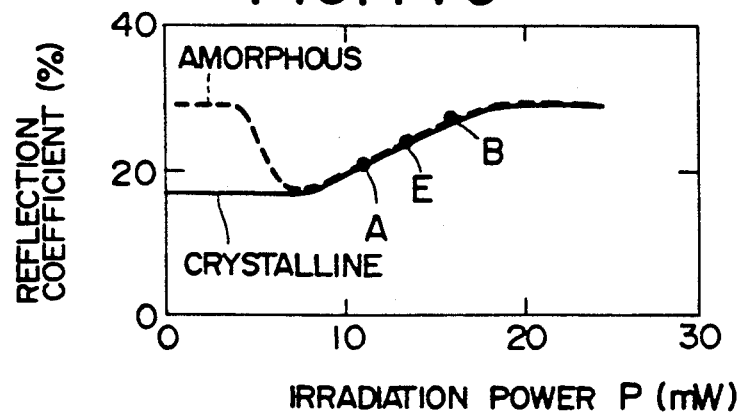

FIG. 14C shows the relation between irradiation power and reflection coefficient with a irradiation time of 0.2 $\mu$s. FIG. 14B is relative to the outer periphery of the disk, and FIG. 14C is relative to the inner periphery (R=30 mm). In FIGS. 14A to 14C, points A and C are directed to the case measured at the operating point in the crystallizing mode, and points B and D are directed to the case measured at the operating point in the amorphousizing mode. The solid line indicates the case where the initial state is crystalline, and the broken line indicates the case where the initial state is amorphous. In FIG. 14B, the crystallizing power is 8 mW, the melt power is 10 mW, and the amorphousizing power is 12 mW. In FIG. 14C, the crystallizing power is 5 mW, the melt power is 8 mW, and the amorphousizing power is 14 mW. With the first irradiation power P1 set at 15 mW (B point) and the second irradiation power P2 set at 11 mW (A point) in the inner periphery, and with the first irradiation power P1 set at 15 mW (D point) and the second irradiation P2 set at 11 mW (C point) in the outer periphery, the overwrite is repeated at frequencies of 2.75 MHz and 3.75 MHz. As a result, a CNR of 48 dB and an erasing ratio of 40 dB are obtained in the inner periphery, and a CNR of 50 dB and an erasing ratio of 37 dB are obtained in the outer periphery. Thus, by setting the irradiation powers P1 and P2 at the operating points above the melt line 4 for both inner and outer peripheries at different linear speeds so as to cause phase change between the recrystallizing region and amorphousizing region, melting the recording film of the recording position, the previous history can be removed, thus providing a high erasing ratio of 35 dB or more for both inner and outer peripheries.

Figure 15:
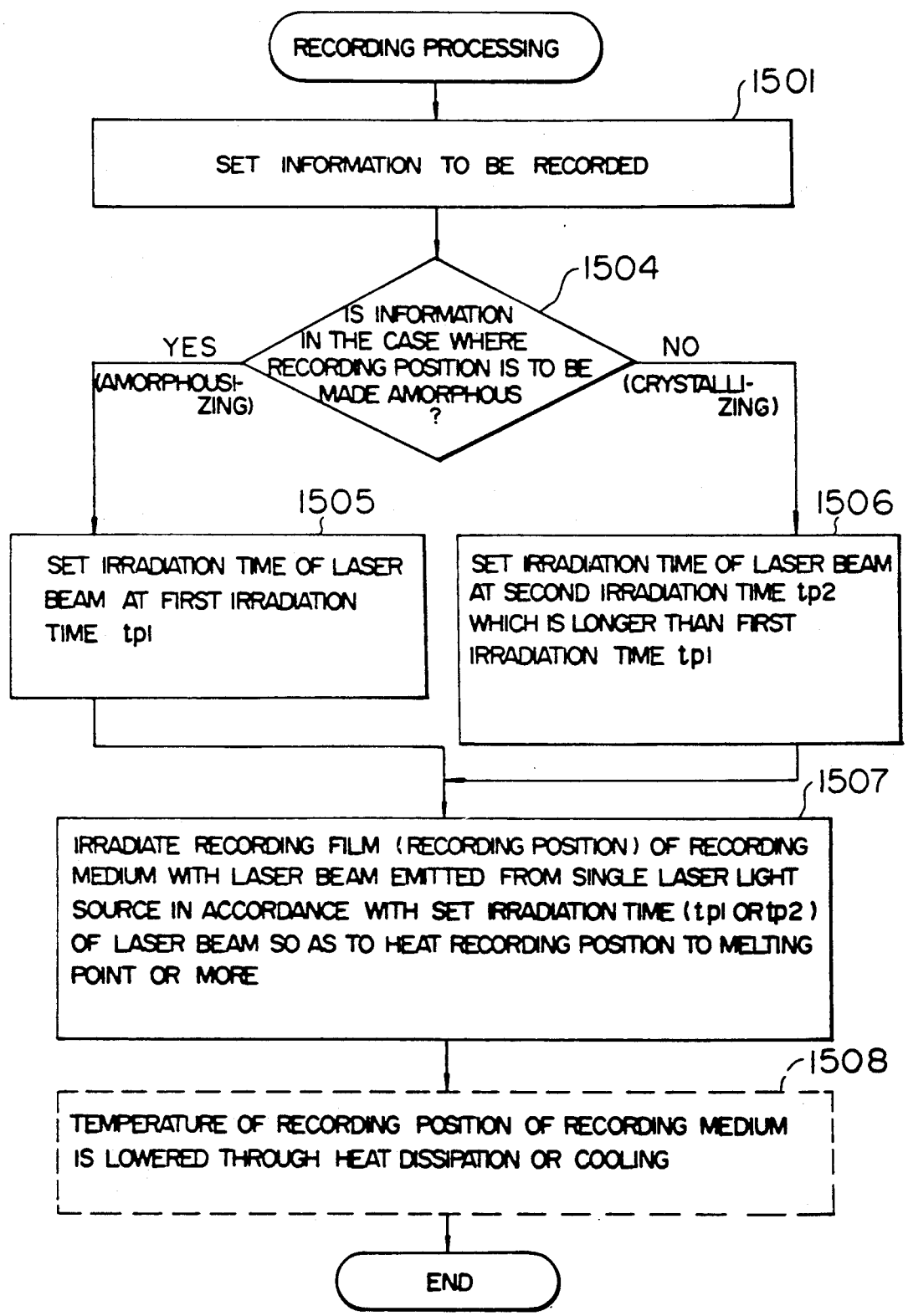
FIG. 15 is a flow diagram showing the recording process in accordance with a further embodiment of the present invention.
Figure 16:
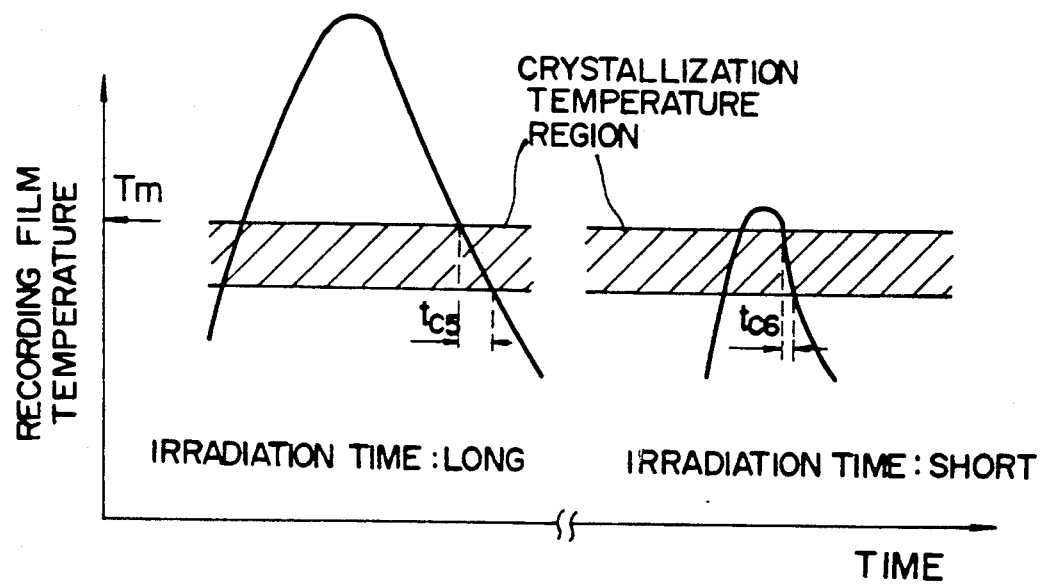
FIG. 16, consisting of (A) and (B), presents a temperature profiles in accordance with another embodiment of the present invention.

Further, by controlling the irradiation time, the phase state at the recording film of the recording position can be controlled. The flow chart for recording information in this case is illustrated by steps 1501 to 1508 in FIG. 15. The temperature profiles of the recording film in this case are shown in FIG. 16. As seen from FIG. 16, in the case where the irradiation time is long, the maximum arrival temperature is higher than the case where the irradiation time is short, since higher energy is provided with the same power. Since the maximum temperature is set higher in the cooling process, the profile passing the crystallization temperature can be set in a second moderate change region of the temperature profile. The temperature profile experiences a first moderate change in the neighborhood of the peak thereof, an abrupt change along the way, and a second moderate change in the low temperature region again. Further, the slope of the temperature profile is more moderate than the case of the short irradiation time due to the lengthened irradiation time.

On the other hand, in the case where the irradiation time is short, the profile passing the crystallization temperature region is in a steep portion since the maximum arrival temperature is relatively low. Also, the profile slope itself is steep due to the shortened irradiation time. Thus, the passing time $t_c5$ through the crystallization temperature region in the case where the irradiation time is long can be lengthened, whereas the passing time $t_c6$ through the crystallization temperature region in the case where the irradiation time is short can be shortened. By controlling this passing time, the phase state of the recording position can be controlled to be amorphous or crystalline, and the recording position, after once being heated to a temperature higher than the melting point, can be overwritten. Then, the operating point of the crystallization corresponds to point E in FIGS. 14A to 14C, and that of the amorphousizing corresponds to point F therein.

As explained above, the basic idea of the present invention, as shown in the flow chart of FIG. 1, is to once heat the recording film at a recording position to the temperature of the melting point or more, and thereafter to change the time required for the temperature of the heated recording position to pass through the crystallization temperature region in accordance with whether information to be recorded is amorphous or crystalline. Thus, the previous history can be removed, by melting the recording film thus overwriting with a high erasing ratio.

Figure 17:
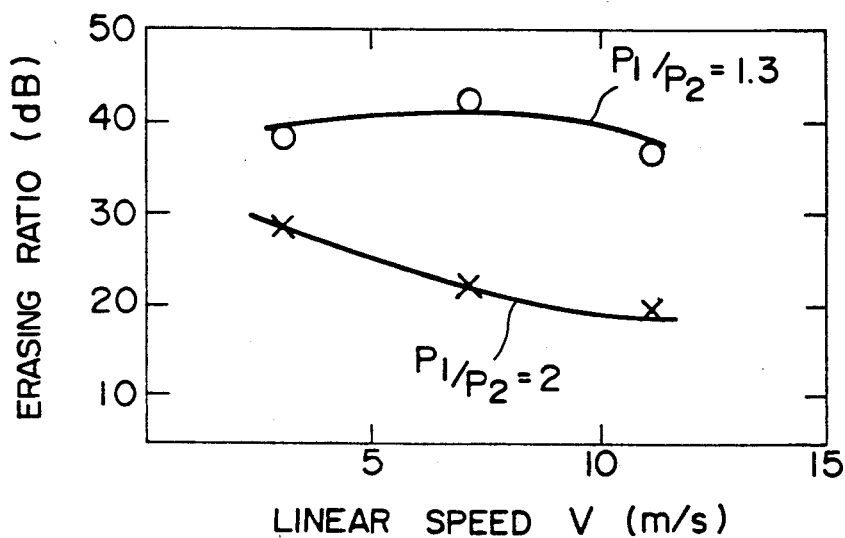
FIGS. 17 and 18 are a characteristic graph of linear speed vs erasing ratio and of crosstalk vs a carrier level, respectively.

FIG. 17 shows the relation between the linear speed V and the erasing ratio. The operation of the present invention, indicated by marks of "$a$" (or line of $P_1/P_2=1.3$), provides high erasing ratios of 35 dB or more in the range of the linear speed of the 3 m/s to 12 m/s irrespectively of the linear speed. On the other hand, the operation of the conventional example, indicated by marks of "X" (or line of $P_1/P_2=2$) provides low-quality erasing.

The present invention has an advantage of providing a high erasing ratio irrespective of the linear speed.

Meanwhile, the irradiation power (more precisely irradiation power linear density) is larger in the inner periphery with a lower linear speed so that the spread of heat in the direction of track width is larger in the inner periphery, which gives rise to problems of increase of crosstalk and erasure of neighboring tracks.

In order to provide the record free from any defect in both inner and outer peripheries in a system with a varying linear speed, it is necessary to appropriately define the gradient of the amorphousizing boundary line above the recrystallizing region for the laser irradiation time.

Figure 18:
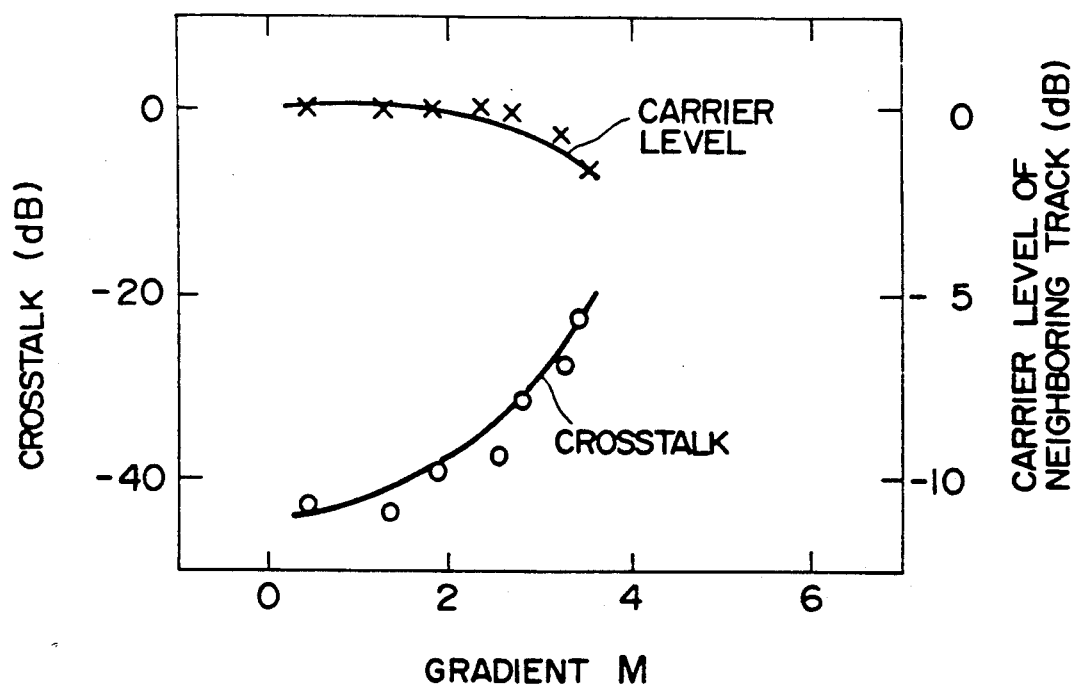

FIG. 18 shows relations between the gradient M of the amorphousizing boundary line, crosstalk due to expansion of the recording pits in the inner periphery, and the erasing ratio in the neighboring tracks (represented by reduction of the carrier level therein) when the gradient of the amorphousizing boundary line is varied by varying the film thickness of the reflection film of Au or Cu in the disk of FIG. 10 or FIG. 13, or using an aluminum (Al) film having a thermal conductivity lower than those Au and Cu. In this case, $P_1$ and $P_2$ at the respective operating points are optimized so as to provide a high CNR and a high erasing ratio.

The gradient M of the amorphousizing boundary line is expressed by $$M = \frac{P_{p2} - P_{p1}}{P_{p1}} \cdot \frac{t_{p1}}{t_{p2} - t_{p1}}$$

where $P_{p1}$: irradiation power on amorphousizing boundary line at the laser irradiation time $T_{p1}$ $P_{p2}$: irradiation power on amorphousizing boundary line at the laser irradiation time $T_{p2}$ $t_{p1}$: laser irradiation time in the outer periphery $t_{p2}$: laser irradiation time in the inner periphery Then, at $M > 3$, the recording bit width abruptly increases to erase the neighboring track and increase the crosstalk over a permissible limit of 30 dB.

At $M \leq 3$, the crosstalk and the erasure of the neighboring track can be restrained so that the single beam overwrite can be performed for an optical disk in which the linear speed varies by a factor of two.

Further, in an optical disk for data, it is preferable to set the radius ratio between the outermost track and the innermost track at twice or more in view of the recording capacity. Then, $t_{p2}/t_{p1} > 2$. Therefore, it is preferable to set $t_{p2}/t_{p1} > 3$ with a 1.5 times margin for operating sake.

Figure 19:
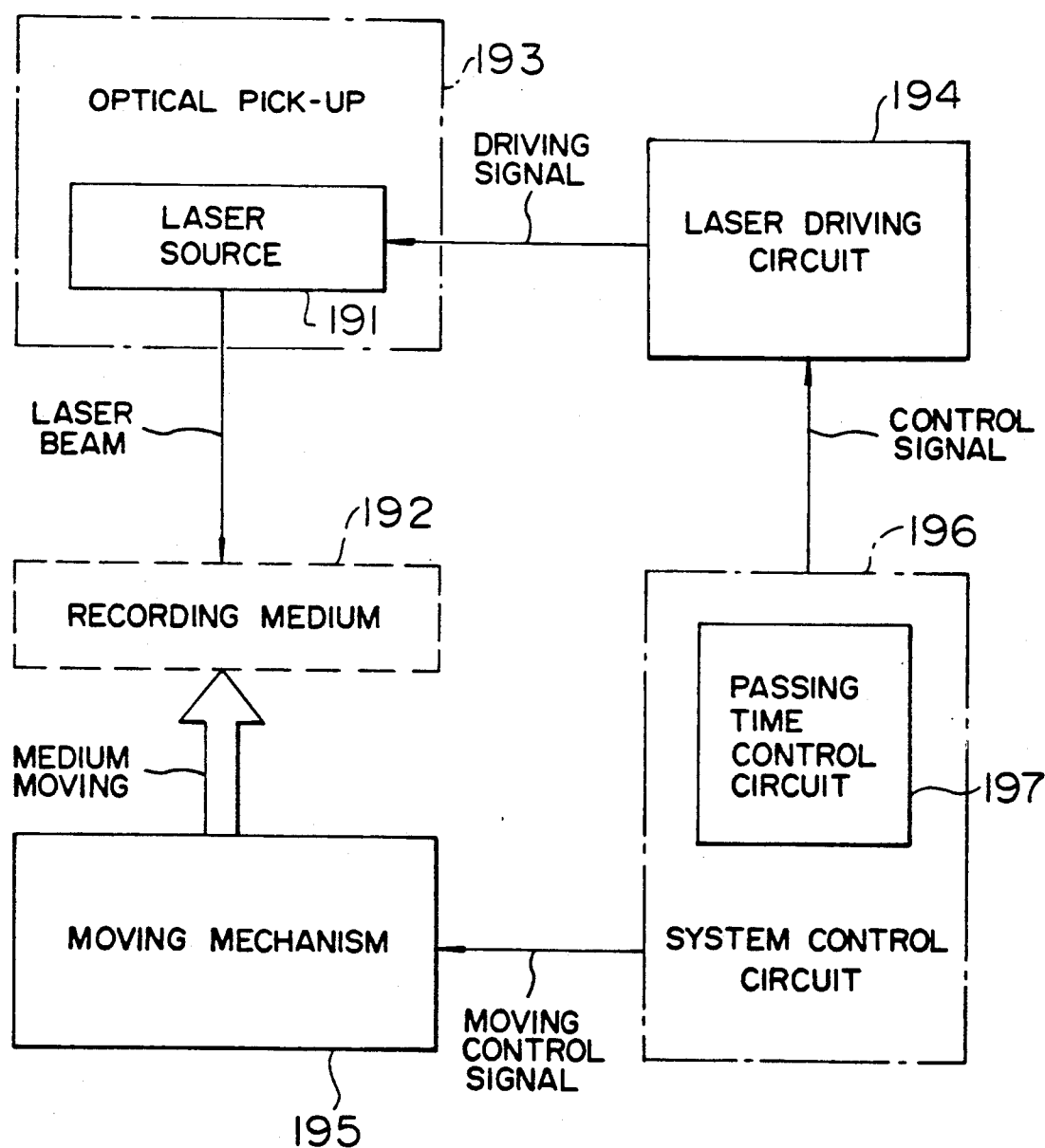
FIG. 19 is a block diagram of an optical information apparatus in accordance with one embodiment of the present invention.

FIG. 19 is a block diagram of the arrangement of one embodiment of an optical information recording device. In the figure, 191 is a laser light source for irradiating a laser beam spot on a recording position in the recording film of a recording medium 192. Reference numeral 193 denotes an optical pick-up including the laser light source 191. Reference numeral 194 denotes a laser driving circuit for driving the laser light source 191 in the optical pick-up 193. Reference numeral 195 denotes a moving mechanism for providing relative movement between the recording medium 192 and the optical pick-up 193. Reference numeral 196 denotes a system control circuit for controlling the moving mechanism 195 and also controlling the laser driving circuit 194 on the basis of predetermined information. The system control circuit 196 incorporates a passing time control circuit 197 for controlling the laser driving circuit 194 so that the recording position in the recording medium 192 is heated to the melting point or more regardless of the information to be recorded, and controlling the time required for the recording position to pass the crystallization temperature region of the recording medium 192 after the recording position has been heated to the melting point or more, in accordance with information to be recorded.

In the case where information is to be recorded, the system control circuit 196 first sends a moving control signal to the moving mechanism 195 to shift the recording medium 192 relatively for the optical pick-up 193. Next, the system control circuit 196 sends a laser driving control signal corresponding to the information to be recorded to the laser driving circuit 194 with reference to the passing time control circuit 197.

In the case where information is to be recorded as an amorphous state, the system control circuit 196 sends to the laser driving circuit 194 a control signal for heating the recording position to apply the laser beam to the melting point or more to shorten the passing time required to pass the crystallization temperature region. In accordance with this control signal, the laser driving circuit 194 sends a driving signal to the laser light source 191. In accordance with this driving signal, the laser light source 191 irradiates the laser beam on the recording medium 192. In accordance with the recording technique, the amorphousizing of the recording position can be implemented, for example, by irradiating the laser with high power and with a narrow pulse width so as to shorten the irradiation time, thereby to shorten the time required to pass the crystallization temperature region of the recording medium.

On the other hand, in the case where information is to be recorded as a crystalline state, the laser light source 191 is driven so as to heat the recording position to the melting point or more and also to irradiate it with the laser with low power and a wide pulse width, increasing the irradiation time with reference to the passing time control circuit 197. Thus, as explained in connection with the recording technique previously mentioned, the passing time required to pass the crystallization temperature region can be increased, thus crystallizing the recording film of the recording position.

In this way, in accordance with the present invention, the recording film of the recording position is heated to the melting point or more to remove the previous history at the time of overwrite by melting the recording film of overwriting position, thereby providing an optical information recording apparatus with a high erasing ratio and few errors. Incidentally, the passing time control circuit 197 may be placed outside the system control circuit 196.

Figure 20A:
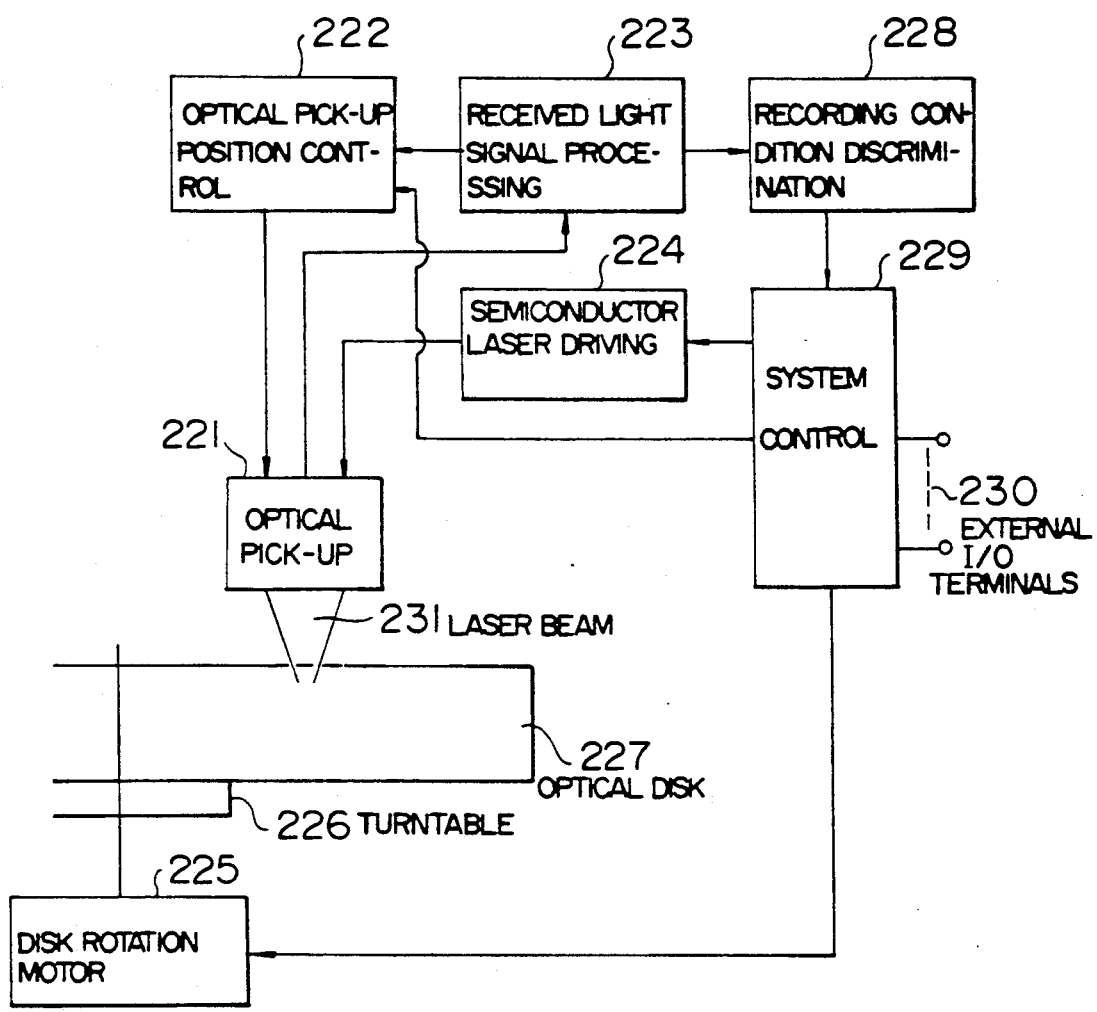
FIGS. 20A and 20B are a block diagram of an optical information recording/reproducing apparatus in accordance with one embodiment of the present invention and a representation of an optical disk having controlled record used therefore, respectively.

FIG. 20A shows the arrangement of an optical information recording/reproducing apparatus in accordance with one embodiment of the present invention. This apparatus comprises an optical pick-up 221 irradiating a laser beam 231 on an optical disk 227 having a tracking guide, an optical pick-up position control circuit 222, a received light signal processing circuit 223, a semiconductor laser driving circuit 224, a disk rotating motor 225, a turn table 226, a recording condition discriminating circuit 228 for an optical disk recording film, a system control circuit 229, and a group of external input-/output terminals 230.

Figure 20B:
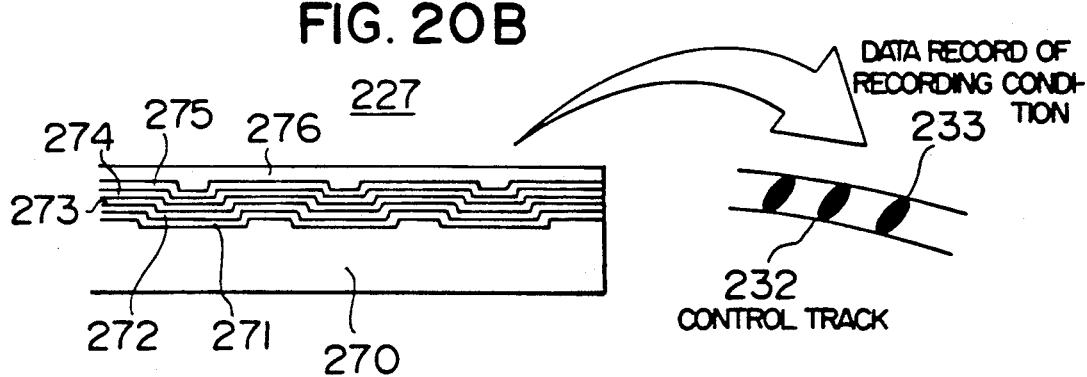
Figure 21:
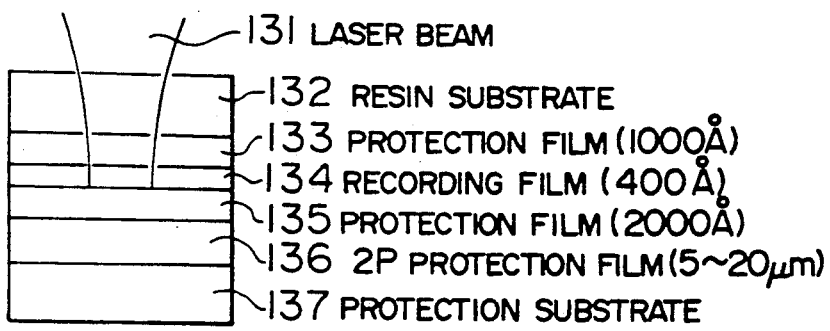
Figure 22:
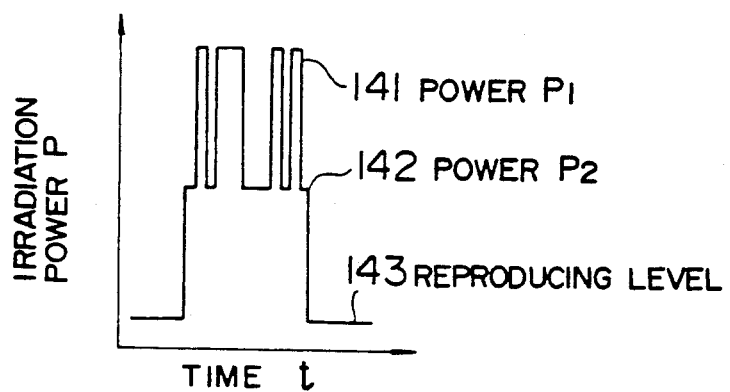
Figure 23:
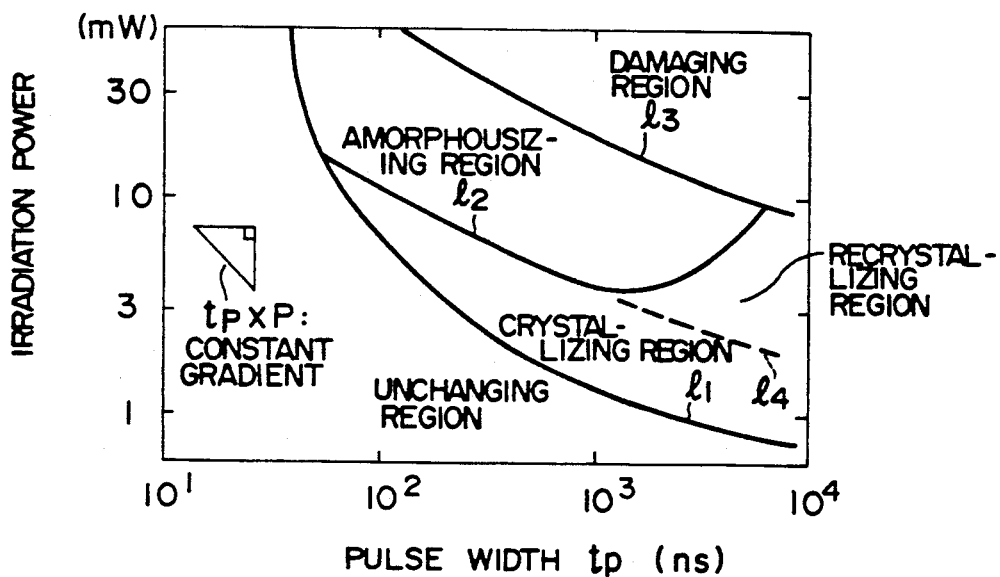
Figure 24:
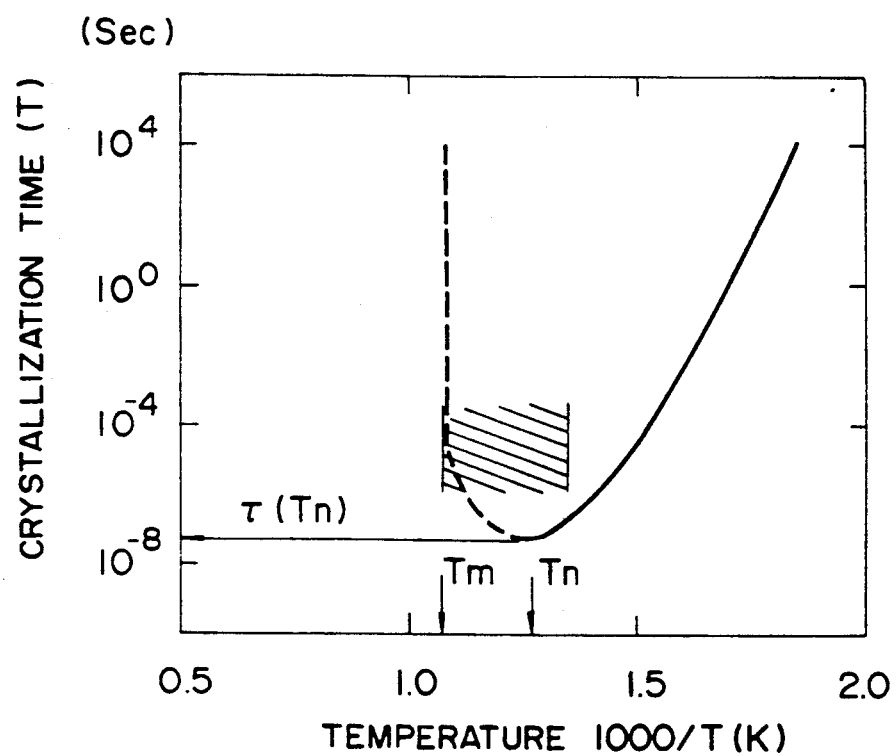
FIG. 24 is a characteristic graph of crystallization time vs temperature.
Figure 25:
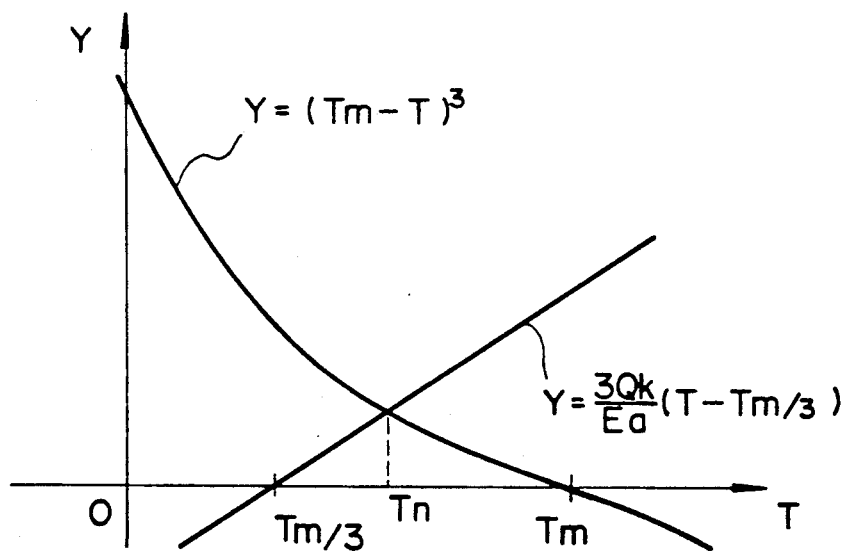
FIGS. 25 to 29 are characteristic graphs for explaining a crystallization temperature region, respectively.
Figure 26:
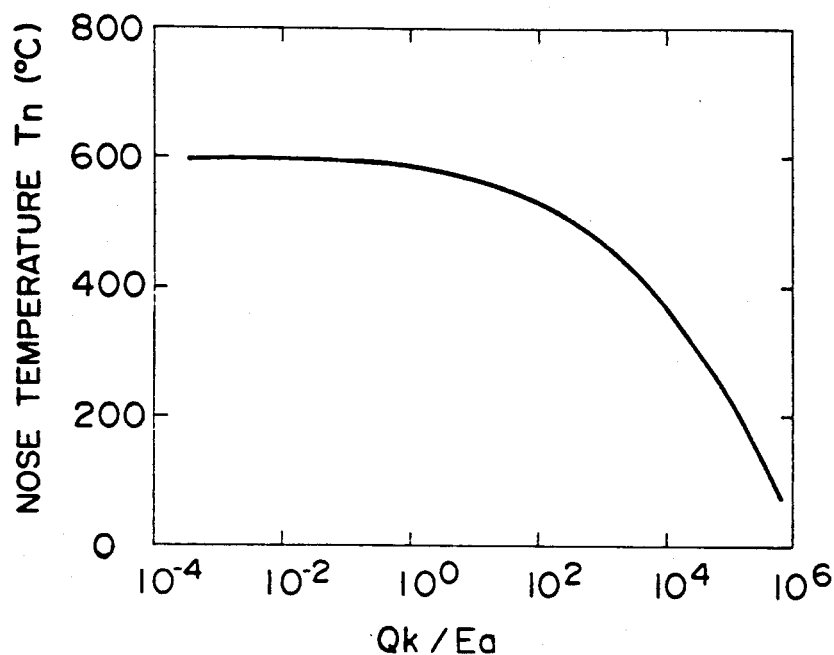
Figure 27:
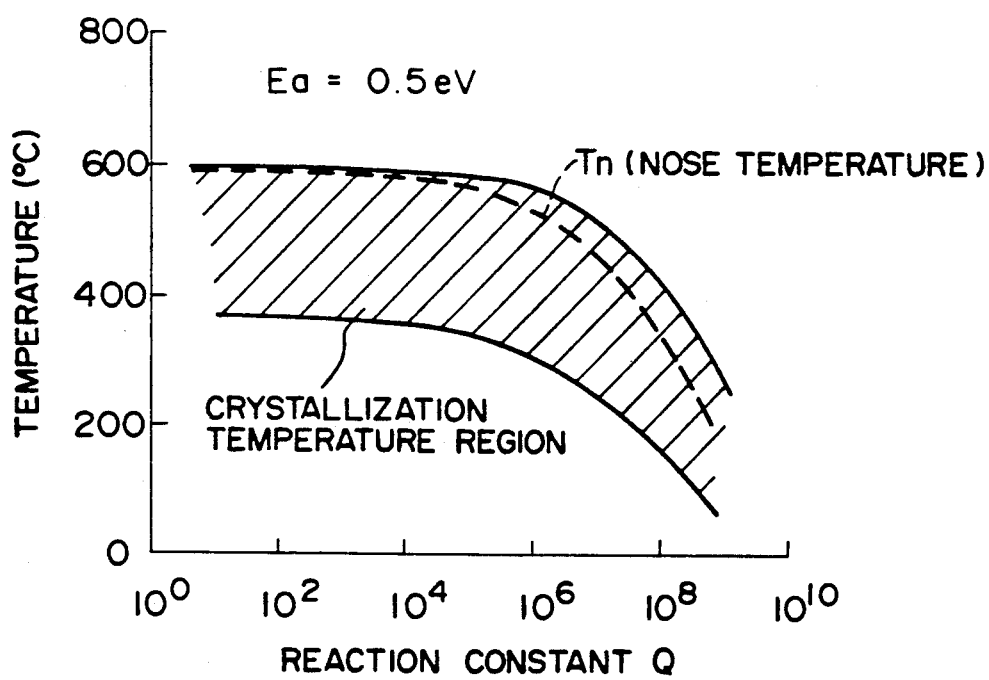
Figure 28:
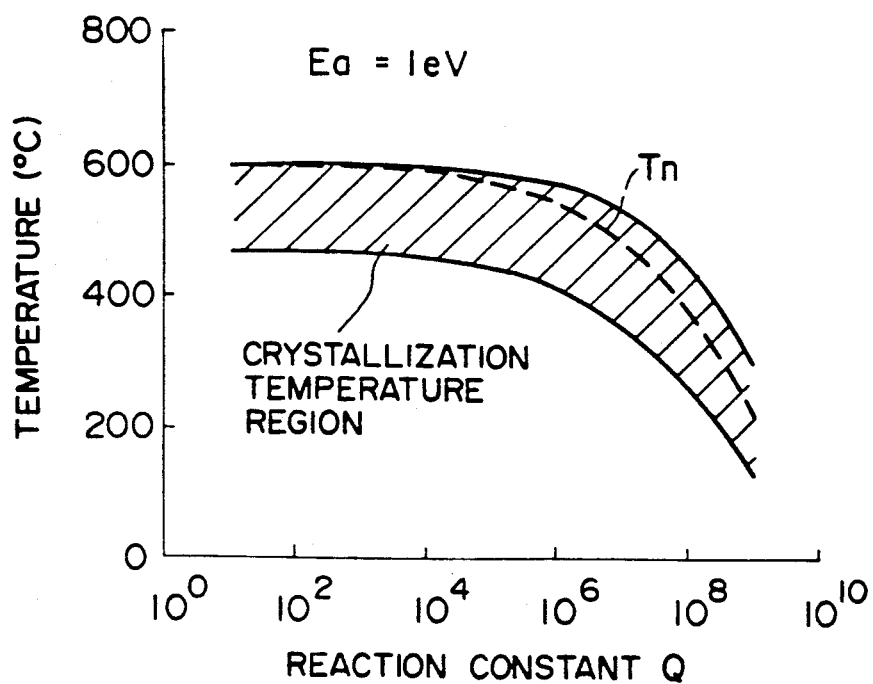
Figure 29:
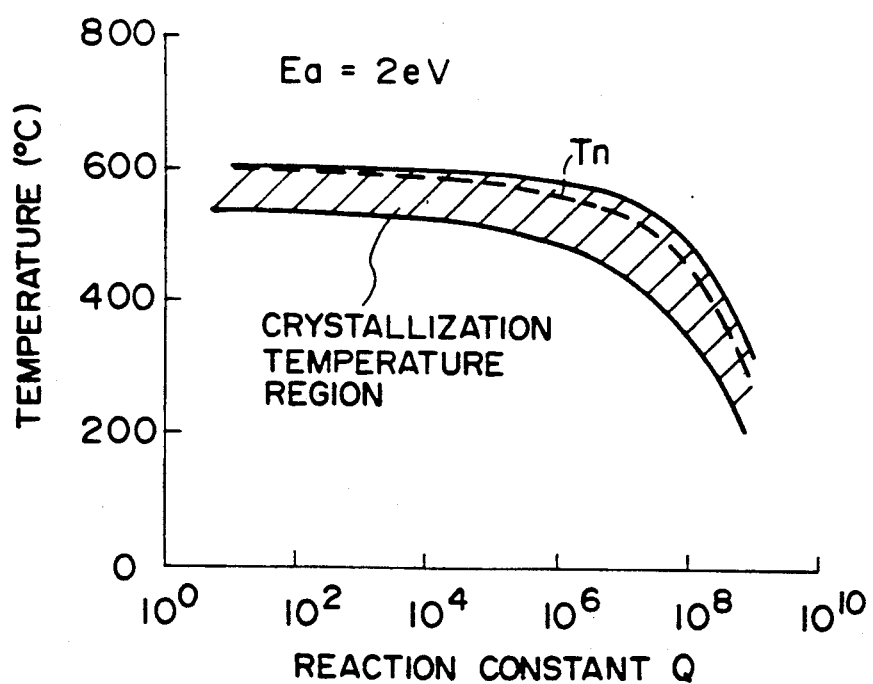
Figure 30A:
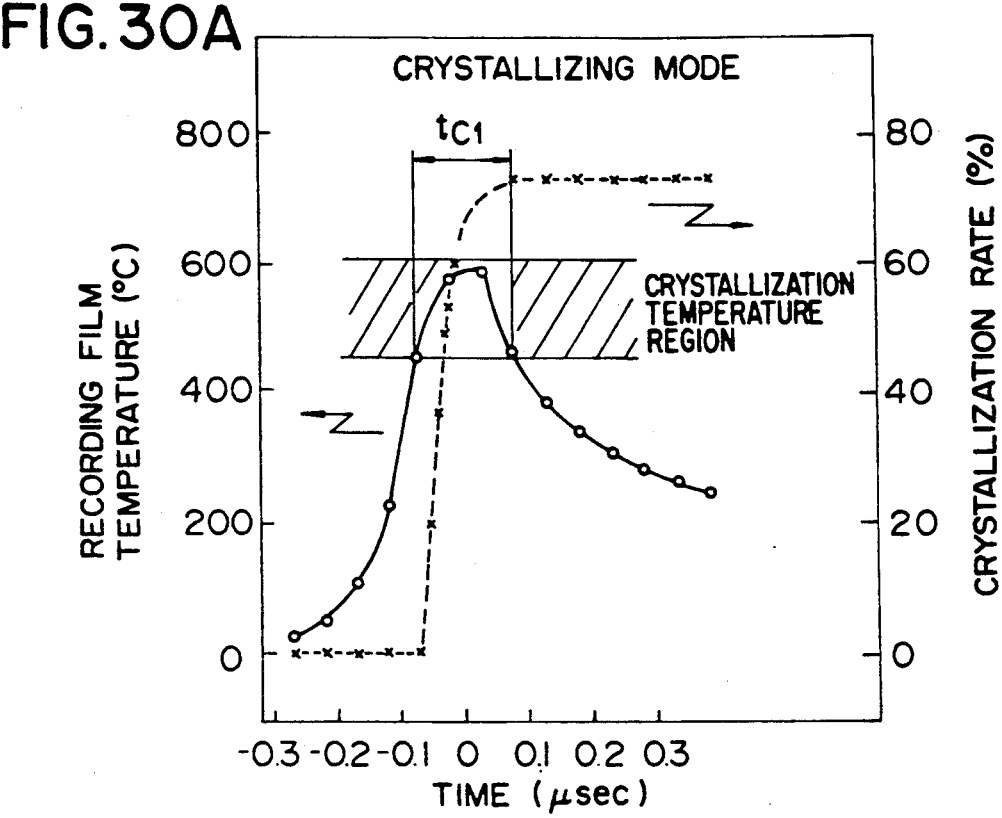
FIGS. 30A and 30B are graphs showing the crystallization process of a phase change recording film in the crystallizing mode and the amorphousizing mode in relation to the crystallization rate thereof, respectively.
Figure 30B:
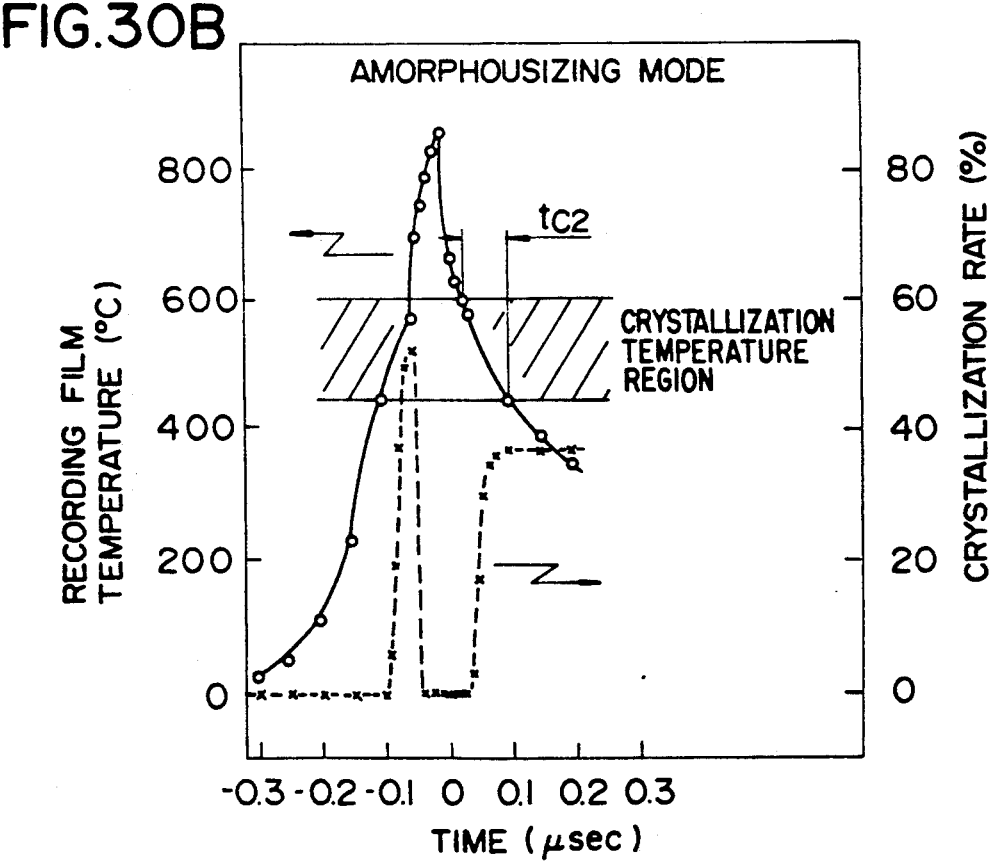

As shown in FIG. 20B, the optical disk 227 is formed of an AlN film 271, an In-Sb-Te system thin film 272, another AlN film 273, an Au film 274, a further AlN film 275, and an ultraviolet ray setting resin film 276 successively stacked on a glass substrate 270. More specifically, the AlN film 271 having a thickness of 70 nm is formed on the glass substrate 270, the In-Sb-Te system thin film 272 having a thickness of 50 nm is formed as a recording film thereon; another AlN film 273 having a thickness of 70 nm is formed thereon; the Au film 274 having a thickness of 100 nm is formed thereon and the further A(N film 275 having a thickness of 100 nm is formed as a protection film thereon. These films are formed through sputtering techniques. Finally, the ultraviolet ray setting resin film 276 having a thickness of 10 μm is spin-coated as a protection film on film 275.

The optical disk 227 is placed on the turntable 226, which is rotated by the motor 225 so as to rotate the optical disk 227. The on-off control of rotation is performed through the system control circuit 229 from the external input/output terminals 230.

The optical disk 227 is irradiated with the laser beam 231 from the optical pick-up 221. Reflection light from laser beam 231 returns to the optical pick-up 221. The reflection light is sent to the received light signal processing circuit 223 to provide a signal indicating the height of the optical pick-up and a signal indicating the deviation or difference of the pick-up on a track thereof. Using these signals, the optical pick-up position control circuit 222 provides focusing and tracking of the optical pick-up for the optical disk. The on-off control of the focusing and tracking is performed through the system control circuit 229 from the external input/output terminals 230.

Further, the optical pick-up 221 can be set every moment at optical irradiation power by the system control circuit 229 through the semiconductor driving circuit 224, which permits overwriting by a single beam.

Included in a control track 232 provided in the inner periphery or outer periphery of the optical disk 227 (FIG. 20B) is the data record 233 of the melting point of the recording film in the optical disk 227, or the recording condition (irradiation power, passing time or irradiation time required for amorphousizing or crystallizing, etc.) required for heating the recording position to the melting point or more. This data record 233 is sent to the recording condition discrimination circuit 228 through the optical pick-up 221 and the received light processing circuit 223. The discrimination result is sent to the semiconductor laser driving circuit 224 through the system control circuit 229. Thus, the first irradiation power $P_1$ and the second irradiation power $P_2$ at the time of single beam overwrite can be set at the power for heating the recording film of the overwriting position to the melting point or more. Incidentally, reproduced information passes the discrimination circuit 228 and is sent to the external input/output terminals 230 through the system control circuit 229.

The recording condition discrimination circuit 228 may decode the data record 233 on the recording condition so as to permit the overwriting at the melting point or more; otherwise it may obtain differences in the reflection coefficient during actual laser irradiation using a dummy track to provide the melt power $P_M$ for heating to the melting point from the difference.

Incidentally, the recording condition data (8 bits) includes, for example, a 8-bit start code indicative of the start of the recording condition data, 32-bit data indicative of the melting point of the recording film, 32-bit data indicative of the passing data for amorphousizing after melting 32-bit data indicative of the passing time for crystallization after molten, and 8-bit end code indicative of the end of the recording condition data. Otherwise, the recording condition data includes a 8-bit start code, 32-bit irradiation power data and 32-bit irradiation time data for heating the recording film to the melting point or more for amorphousizing, 32-bit irradiation power data and irradiation time data indicative of the irradiation time for heating the recording film to the melting point or more for crystallization, and 8-bit end code.

In accordance with the present invention, in overwriting new information, the history of the information previously recorded can be removed by heating the recording film to the melting point to be molten in both amorphousizing overwrite mode and crystallizing overwrite mode, thus providing a high erasing ratio. Also by setting the crystallization time of the recording film at a longer .time than the laser irradiation time, a high CNR can be obtained using a single beam. Thus, there are provided a method and apparatus for recording optical information and a recording medium used therefor which permit overwriting using a single beam, with a high erasing ratio.

What is claimed is:

1. In a method of optically recording information on a recording medium, including irradiating a single laser beam onto a recording film on the recording medium while simultaneously moving the recording medium to sequentially move successive recording positions on the recording medium through the single laser beam to heat each recording position to cause the recording position to be selectively placed in an amorphous state or a crystalline state in accordance with the information to be recorded, the improvement comprising controlling the power of the single laser beam in accordance with the information to be recorded to heat the recording position with a first temperature profile, to place the recording position in the amorphous state, or with a second temperature profile, to place the recording position in the crystalline state, the first temperature profile including heating the recording position to a first high temperature at least as high as the melting temperature of the recording film to melt the recording position and then cooling the heated recording position rapidly through a crystallization temperature region of the recording film to a cool temperature to cause the melted recording position to solidify in the amorphous state, and the second temperature profile including heating the recording position to a second high temperature at least as high as the melting temperature of the recording film but lower than the first high temperature to melt the recording position and then cooling the heated recording position slowly through the crystallization temperature region of the recording film to a cool temperature to cause the melted recording position to solidify in the crystalline state, thereby recording the information with the single laser beam, including directly overwriting any information previously recorded on the recording position without performing a separate erasing operation for such previously recorded information.

2. In the method of claim 1, the further improvement wherein each of the first temperature profile and the second temperature profile has a Gaussian distribution.

3. In the method of claim 1, the further improvement wherein controlling the power to heat the recording position with the first temperature profile comprises setting the power to a first irradiation power level to heat the recording position to the first high temperature, and controlling the power to heat the recording position with the second temperature profile comprises setting the power to a second irradiation power level lower than the first irradiation power level to heat the recording position to the second high temperature.

4. In the method of claim 3, the further improvement wherein controlling the power to heat the recording position with the first temperature profile further comprises heating the recording position for a first irradiation time, and controlling the power to heat the recording position with the second temperature profile comprises heating the recording position for a second irradiation time longer than the first irradiation time, whereby the time required for the heated recording film to cool through the crystallization temperature region is different for the two temperature profiles.

5. In the method of claim 1, the further improvement wherein controlling the power to heat the recording position with the first temperature profile comprises heating the recording position for a first irradiation time, and controlling the power to heat the recording position with the second temperature profile comprises heating the recording position for a second irradiation time longer than the first irradiation time, whereby the time required for the heated recording film to cool through the crystallization temperature region is different for the two temperature profiles.

6. Apparatus for optically recording information on a recording medium, comprising a laser light source having a single laser beam for irradiating a recording film on the recording medium;

means for moving the recording medium to sequentially move successive recording positions on the recording medium through the single laser beam to heat each recording position to cause the recording position to be selectively placed in an amorphous state or a crystalline state in accordance with the information to be recorded, and control means responsive to the information to be recorded for controlling the power of the single laser beam to selectively heat the recording position either with a first temperature profile, to place the recording position in the amorphous state, or with a second temperature profile, to place the recording position in the crystalline state, the first temperature profile including heating the recording position to a first high temperature at least as high as the melting temperature of the recording film to melt the recording position and then cooling the heated recording position rapidly through a crystallization temperature region of the recording film to a cool temperature to cause the melted recording position to solidify in the amorphous state, and the second temperature profile including heating the recording position to a second high temperature at least as high as the melting temperature of the recording film but lower than the first high temperature to melt the recording position and then cooling the heated recording position slowly through the crystallization temperature region of the recording film to a cool temperature to cause the melted recording position to solidify in the crystalline state, thereby recording the information with the single laser beam, including directly overwriting any information previously recorded on the recording position without performing a separate erasing operation for such previously recorded information.

* * * * *